(12) United States Patent
Hong et al.

(10) Patent No.: US 12,052,411 B2
(45) Date of Patent: Jul. 30, 2024

(54) ADJUSTMENT DEVICE AND METHOD OF OPERATING THE SAME

(71) Applicant: SAMSUNG ELECTRONICS CO., LTD., Suwon-si (KR)

(72) Inventors: Sungbin Hong, Suwon-si (KR); Chulkwi Kim, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 102 days.

(21) Appl. No.: 17/844,743

(22) Filed: Jun. 21, 2022

(65) Prior Publication Data

US 2023/0036762 A1 Feb. 2, 2023

Related U.S. Application Data

(63) Continuation of application No. PCT/KR2022/007280, filed on May 27, 2022.

(30) Foreign Application Priority Data

Jul. 30, 2021 (KR) .......................... 10-2021-0100480

(51) Int. Cl.
*H04N 13/398* (2018.01)
*H04N 13/167* (2018.01)
(Continued)

(52) U.S. Cl.
CPC ......... *H04N 13/398* (2018.05); *H04N 13/167* (2018.05); *H04N 13/344* (2018.05); *H04N 13/383* (2018.05)

(58) Field of Classification Search
CPC .. H04N 13/398; H04N 13/167; H04N 13/344; H04N 13/383; H04N 13/366;
(Continued)

(56) References Cited

U.S. PATENT DOCUMENTS

| 10,915,148 B1* | 2/2021 | Richards ................. G06F 3/147 |
| 2019/0041642 A1* | 2/2019 | Haddick ................. G06F 1/163 |

(Continued)

FOREIGN PATENT DOCUMENTS

| CA | 2948524 C * | 6/2022 | ............ G01J 1/4204 |
| JP | 2011-197314 A | 10/2011 | |

(Continued)

*Primary Examiner* — Dramos Kalapodas
(74) *Attorney, Agent, or Firm* — CANTOR COLBURN LLP

(57) ABSTRACT

An adjustment device includes a wearable electronic device and a case in which the wearable electronic device is disposed (e.g., seated). The wearable electronic device includes displays (e.g., display apparatuses) which display virtual images for a left eye and a right eye of a user, screen display portions which transmit light sources generated by the displays to the left eye and the right eye, and eye tracking cameras for the left eye and the right eye. The case includes a stator which fixes the wearable electronic device, and a focal lens which is disposed within an eye relief of the fixed wearable electronic device and forms each of images of the virtual images output from the screen display portions of the wearable electronic device on a portion of the case.

18 Claims, 13 Drawing Sheets

(51) Int. Cl.
*H04N 13/344* (2018.01)
*H04N 13/383* (2018.01)

(58) Field of Classification Search
CPC ............ G02B 27/0093; G02B 27/0172; G02B 27/0176; G02B 2027/0134; G02B 2027/0138; G02B 2027/0159; G02B 2027/0181; G06F 3/013; G06F 3/017; G06F 3/011
See application file for complete search history.

(56) References Cited

U.S. PATENT DOCUMENTS

2020/0209628 A1\* 7/2020 Sztuk ................. G02B 27/0176
2023/0036762 A1\* 2/2023 Hong ................... H04N 13/383

FOREIGN PATENT DOCUMENTS

| | | |
|---|---|---|
| JP | 2013-80083 A | 5/2013 |
| KR | 10-2019-0069028 A | 6/2019 |
| KR | 10-2020-0056481 A | 5/2020 |
| WO | 2016/132974 A1 | 8/2016 |

\* cited by examiner

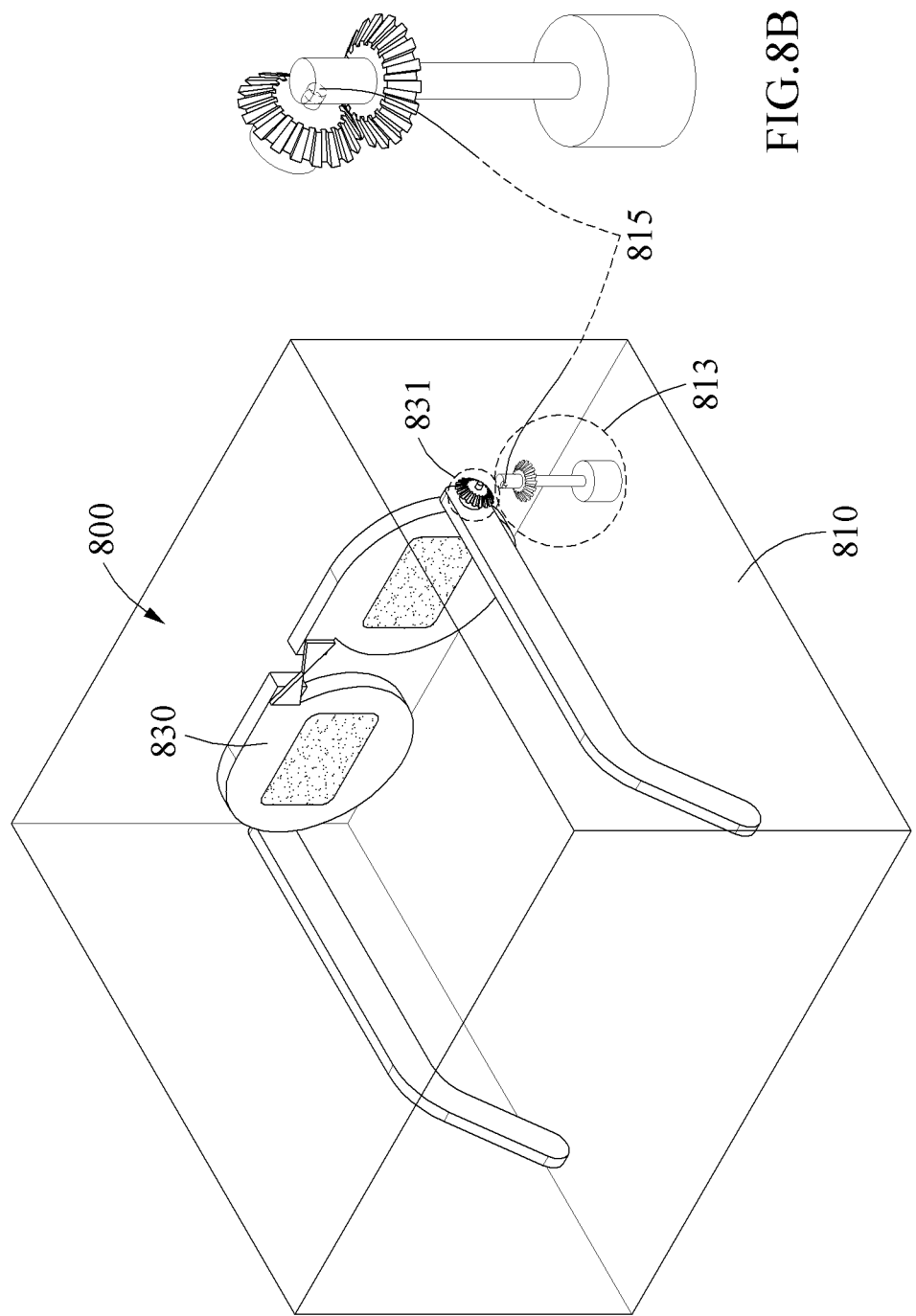

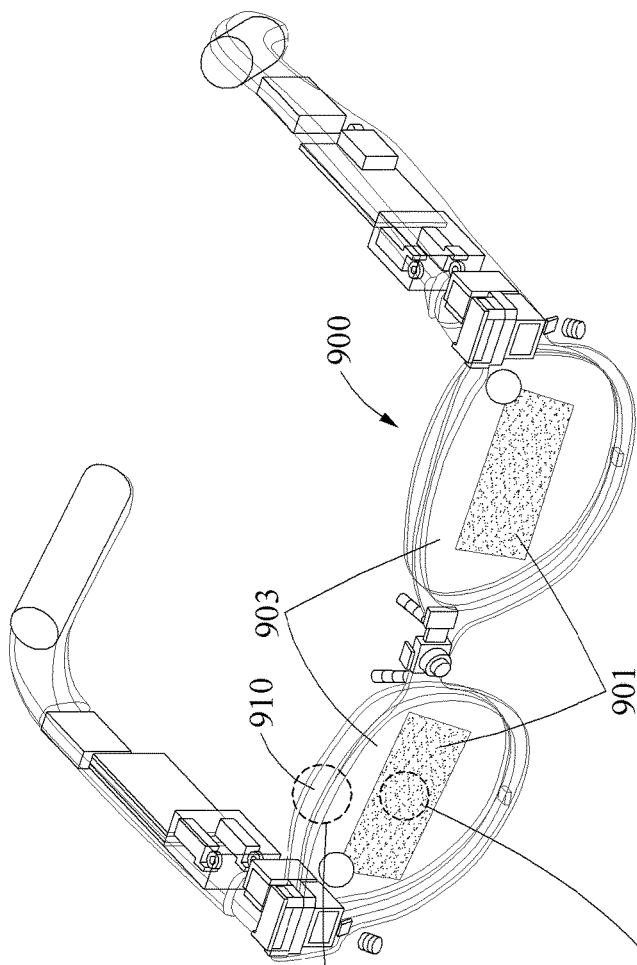
FIG.9A
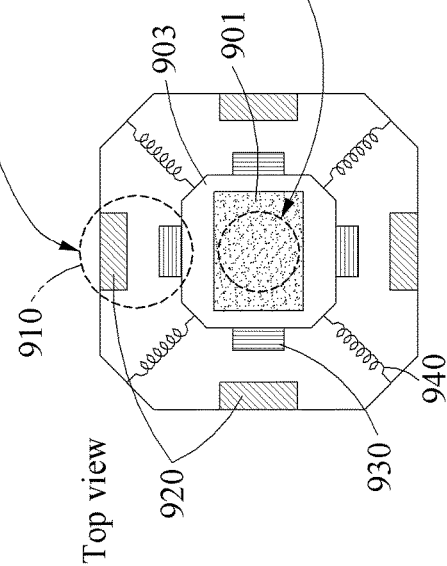
FIG.9B Top view
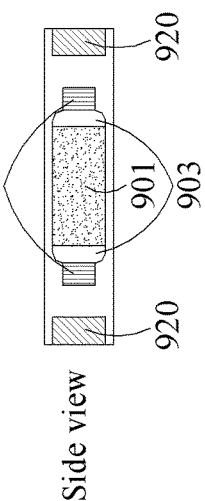
FIG.9C Side view

ADJUSTMENT DEVICE AND METHOD OF OPERATING THE SAME This application is a national stage application of International Application No. PCT/KR2022/007280 designating the United States, filed on May 27, 2022, which claims priority to Korean Patent Application No. 10-2021-0100480, filed on Jul. 30, 2021, and all the benefits accruing therefrom under 35 U.S.C. § 119, the content of which in its entirety is herein incorporated by reference.

BACKGROUND

1. Field

Embodiments of the invention relate to an adjustment device and a method of operating the adjustment device.

2. Description of Related Art

A wearable electronic device for providing an augmented reality ("AR") service is being introduced on the market. The AR service is a service of superimposing a virtual image having supplementary information on a real-world image seen by a user and showing a superimposition result, and may provide a user with a virtual object image including content related to a real object identified from the real-world image. The wearable electronic device for providing the AR service may be configured in a form of a head-mounted display ("HMD"), for example.

SUMMARY

An adjustment device in an embodiment includes a wearable electronic device, and a case in which the wearable electronic device is disposed (e.g., seated). The wearable electronic device may include displays (e.g., display apparatuses) which correspond to a left eye and a right eye of a user and display virtual images, screen display portions which correspond to the left eye and the right eye and transmit light sources generated by the display apparatuses to the left eye and the right eye, and eye tracking cameras which correspond to the left eye and the right eye. The case may include a stator which fixes the wearable electronic device, and a focal lens which is disposed within an eye relief of the fixed wearable electronic device and forms each of images of the virtual images output from the screen display portions of the wearable electronic device on a portion of the case.

A method of operating an adjustment device including a case, in which a wearable electronic device including screen display portions which correspond to a left eye and a right eye of a user and eye tracking cameras which correspond to the left eye and the right eye is disposed, includes transmitting virtual images for measuring a deviation between the screen display portions to the screen display portions, projecting the virtual images onto a portion of the case through focus lenses disposed in the case, capturing the projected virtual images by the eye tracking cameras, and adjusting the screen display portions based on a comparison result of the captured images.

BRIEF DESCRIPTION OF THE DRAWINGS

The above and other features and advantages of embodiments of the invention will be more apparent from the following detailed description, taken in conjunction with the accompanying drawings, in which:

FIG. 8A is a diagram illustrating an embodiment of a method of adjusting screen display portions of a wearable electronic device using a driving device included in a case, and FIG. 8B is an enlarged view of a portion indicated by a dotted line in FIG. 8A;

FIGS. 9A to 9C and 10 are diagrams illustrating an embodiment of a method of adjusting screen display portions of a wearable electronic device using a driving device included in the wearable electronic device;

DETAILED DESCRIPTION

Figure 1:
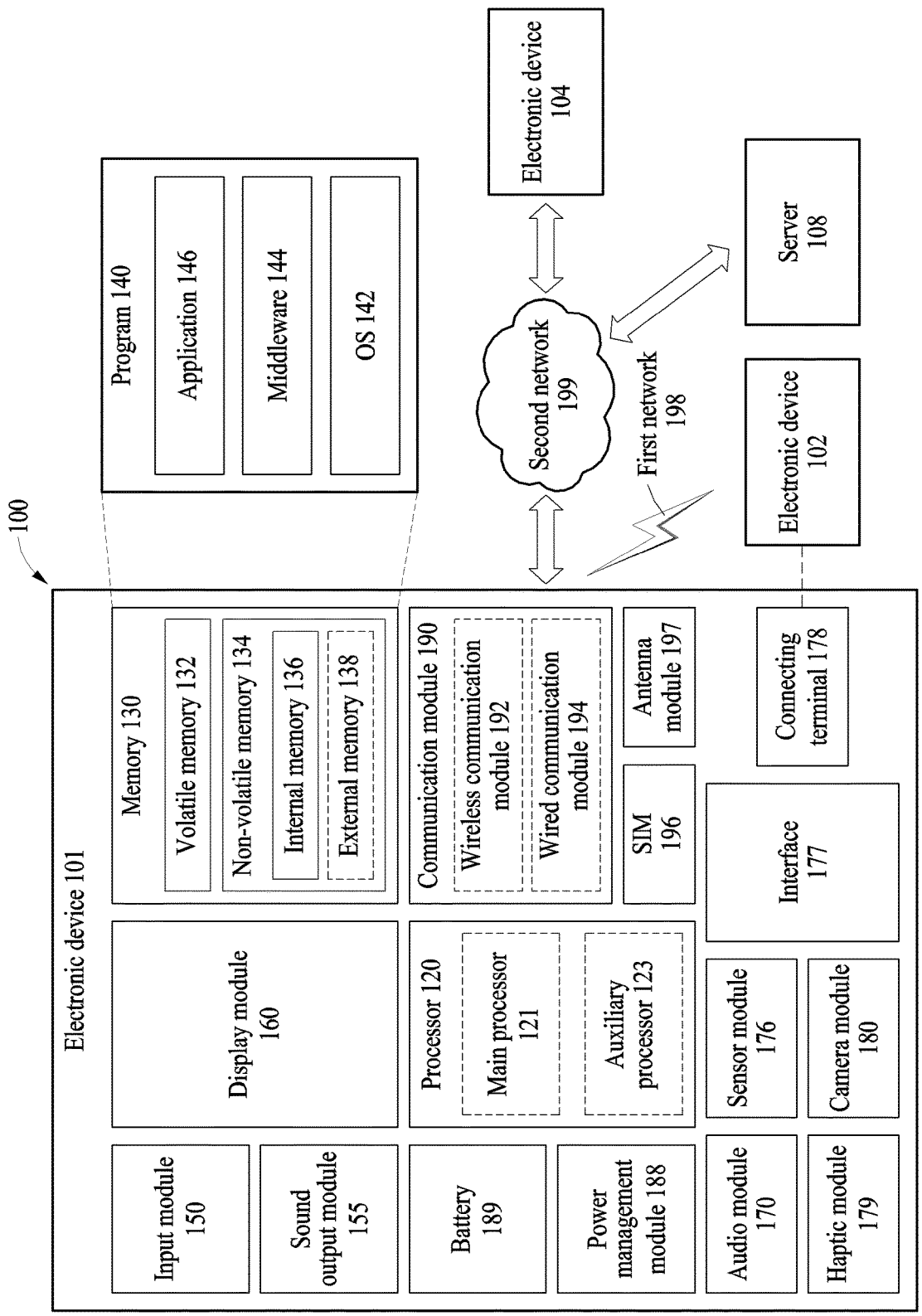
FIG. 1 is a block diagram of an embodiment of an electronic device in a network environment.

Hereinafter, various embodiments will be described in detail with reference to the accompanying drawings. When describing the embodiments with reference to the accompanying drawings, like reference numerals refer to like elements and a repeated description related thereto will be omitted.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. In the description, terms such as "module" may mean "circuitry block". Further, a term "display" may mean a physical structure (e.g., display apparatus) which displays an image.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). In an embodiment, the electronic device 101 may communicate with the electronic device 104 via the server 108. In an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module ("SIM") 196, or an antenna module 197. In some alternative embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be unitarily integrated as a single component (e.g., the display module 160).

In an embodiment, the processor 120 may execute software (e.g., a program 140) to control at least one other component (e.g., a hardware or software component) of the electronic device 101 connected to the processor 120, and may perform various data processing or computation. In an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. In an embodiment, the processor 120 may include a main processor 121 (e.g., a central processing unit ("CPU") or an application processor ("AP")), or an auxiliary processor 123 (e.g., a graphics processing unit ("GPU"), a neural processing unit ("NPU"), an image signal processor ("ISP"), a sensor hub processor, or a communication processor ("CP")) that is operable independently from, or in conjunction with the main processor 121. In an embodiment, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). In an embodiment, the auxiliary processor 123 (e.g., an ISP or a CP) may be implemented as a portion of another component (e.g., the camera module 180 or the communication module 190) that is functionally related to the auxiliary processor 123. In an embodiment, the auxiliary processor 123 (e.g., an NPU) may include a hardware structure specified for artificial intelligence ("AI") model processing. In an embodiment, an AI model may be generated by machine learning. Such learning may be performed by the electronic device 101 in which AI is performed, or performed via a separate server (e.g., the server 108), for example. In an embodiment, learning algorithms may include, but are not limited to supervised learning, unsupervised learning, semi-supervised learning, or reinforcement learning, for example. The AI model may include a plurality of artificial neural network layers. In an embodiment, an artificial neural network may include a deep neural network ("DNN"), a convolutional neural network ("CNN"), a recurrent neural network ("RNN"), a restricted Boltzmann machine ("RBM"), a deep belief network ("DBN"), and a bidirectional recurrent deep neural network ("BRDNN"), a deep Q-network, or a combination of two or more thereof, for example, but is not limited thereto. The AI model may additionally or alternatively include a software structure other than the hardware structure.

In an embodiment, the memory 130 may store various data used by at least one component (e.g., the processor 120 or the sensor module 176) of the electronic device 101. In an embodiment, the various data may include software (e.g., the program 140) and input data or output data for a command related thereto, for example. The memory 130 may include the volatile memory 132 or the non-volatile memory 134. In an embodiment, the non-volatile memory 134 may include an internal memory 136 and an external memory 138.

In an embodiment, the program 140 may be stored as software in the memory 130, and may include an operating system ("OS") 142, middleware 144, or an application 146, for example.

The input module 150 may receive a command or data to be used by another component (e.g., the processor 120) of the electronic device 101, from the outside (e.g., a user) of the electronic device 101. In an embodiment, the input module 150 may include a microphone, a mouse, a keyboard, a key (e.g., a button), or a digital pen (e.g., a stylus pen), for example.

The sound output module 155 may output a sound signal to the outside of the electronic device 101. In an embodiment, the sound output module 155 may include a speaker or a receiver. The speaker may be used for general purposes, such as playing multimedia or playing record. The receiver may be used to receive an incoming call. In an embodiment, the receiver may be implemented separately from the speaker or as a part of the speaker.

The display module 160 may visually provide information to the outside (e.g., a user) of the electronic device 101. In an embodiment, the display module 160 may include a control circuit for controlling a display, a hologram device, or a projector and control circuitry to control a corresponding one of the display, the hologram device, and the projector. In an embodiment, the display module 160 may include a touch sensor adapted to detect a touch, or a pressure sensor adapted to measure the intensity of force incurred by the touch.

The audio module 170 may convert a sound into an electric signal or vice versa. In an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. In an embodiment, the sensor module 176 may include a gesture sensor, a gyro sensor, an atmospheric pressure sensor, a magnetic sensor, an acceleration sensor, a grip sensor, a proximity sensor, a color sensor, an infrared ("IR") sensor, a biometric sensor, a temperature sensor, a humidity sensor, or a fingerprint sensor, for example.

The interface 177 may support one or more specified protocols to be used for the electronic device 101 to be coupled with the external electronic device (e.g., the electronic device 102) directly (e.g., by a wire connection) or wirelessly (e.g., without a wire connection). In an embodiment, the interface 177 may include a high-definition multimedia interface ("HDMI"), a universal serial bus ("USB") interface, a secure digital ("SD") card interface, or an audio interface, for example.

The connecting terminal 178 may include a connector via which the electronic device 101 may be physically connected to an external electronic device (e.g., the electronic device 102). In an embodiment, the connecting terminal 178 may include an HDMI connector, a USB connector, an SD card connector, or an audio connector (e.g., a headphone connector), for example.

The haptic module 179 may convert an electric signal into a mechanical stimulus (e.g., a vibration or a movement) or an electrical stimulus which may be recognized by a user via tactile sensation or kinesthetic sensation of the user. In an embodiment, the haptic module 179 may include a motor, a piezoelectric element, or an electric stimulator, for example.

The camera module 180 may capture a still image and moving images. In an embodiment, the camera module 180 may include one or more lenses, image sensors, image signal processors, or flashes.

The power management module 188 may manage power supplied to the electronic device 101. In an embodiment, the power management module 188 may be implemented as at least a part of a power management integrated circuit ("PMIC"), for example.

The battery 189 may supply power to at least one component of the electronic device 101. In an embodiment, the battery 189 may include a primary cell which is not rechargeable, a secondary cell which is rechargeable, or a fuel cell, for example.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. In an embodiment, the communication module 190 may include a wireless communication module 192 (e.g., a cellular communication module, a short-range wireless communication module, or a global navigation satellite system ("GNSS") communication module) or a wired communication module 194 (e.g., a local area network ("LAN") communication module, or a power line communication ("PLC") module). A corresponding one of these communication modules may communicate with the external electronic device 104 via the first network 198 (e.g., a short-range communication network, such as Bluetooth™, wireless-fidelity ("Wi-Fi") direct, or infrared data association ("IrDA")) or the second network 199 (e.g., a long-range communication network, such as a legacy cellular network, a 5G network, a next-generation communication network, the Internet, or a computer network (e.g., a LAN or a wide area network ("WAN"))). These various types of communication modules may be implemented as a single component (e.g., a single chip), or may be implemented as multi components (e.g., multi chips) separated from each other. The wireless communication module 192 may identify and authenticate the electronic device 101 in a communication network, such as the first network 198 or the second network 199, using subscriber information (e.g., international mobile subscriber identity ("IMSI")) stored in the SIM 196.

The wireless communication module 192 may support a 5G network subsequent to a 4G network, and next-generation communication technology, e.g., new radio ("NR") access technology. The NR access technology may support enhanced mobile broadband ("eMBB"), massive machine type communications ("mMTC"), or ultra-reliable and low-latency communications ("URLLC"). The wireless communication module 192 may support a high-frequency band (e.g., a millimeter wave ("mmWave") band) to achieve a high data transmission rate, for example. The wireless communication module 192 may support various technologies for securing performance on a high-frequency band, such as beamforming, massive multiple-input and multiple-output ("MIMO"), full dimensional MIMO ("FD-MIMO"), an array antenna, analog beam-forming, or a large scale antenna. The wireless communication module 192 may support various requirements specified in the electronic device 101, an external electronic device (e.g., the electronic device 104), or a network system (e.g., the second network 199). In an embodiment, the wireless communication module 192 may support a peak data rate (e.g., about 20 gigabits per second (Gbps) or more) for implementing eMBB, loss coverage (e.g., about 164 decibel (dB) or less) for implementing mMTC, or U-plane latency (e.g., about 0.5 millisecond (ms) or less for each of downlink ("DL") and uplink ("UL"), or a round trip of about 1 ms or less) for implementing URLLC.

The antenna module 197 may transmit or receive a signal or power to or from the outside (e.g., the external electronic device) of the electronic device 101. In an embodiment, the antenna module 197 may include an antenna including a radiating element including a conductive material or a conductive pattern formed in or on a substrate (e.g., a printed circuit board ("PCB")). In an embodiment, the antenna module 197 may include a plurality of antennas (e.g., array antennas). In such a case, at least one antenna appropriate for a communication scheme used in a communication network, such as the first network 198 or the second network 199, may be selected by the communication module 190 from the plurality of antennas, for example. The signal or the power may be transmitted or received between the communication module 190 and the external electronic device via the at least one selected antenna. In an embodiment, another component (e.g., a radio frequency integrated circuit ("RFIC")) other than the radiating element may be additionally formed as a part of the antenna module 197.

According to various embodiments, the antenna module 197 may form a mmWave antenna module. In an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output ("GPIO"), serial peripheral interface ("SPI"), or mobile industry processor interface ("MIPI")).

In an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. The external electronic device 102 may be a wearable electronic device 200, for example.

In an embodiment, all or some of operations to be executed by the electronic device 101 may be executed at one or more external electronic devices (e.g., the external devices 102 and 104, and the server 108). In an embodiment, when the electronic device 101 needs to perform a function or a service automatically, or in response to a request from a user or another device, for example, the electronic device 101, instead of, or in addition to, executing the function or the service, may request the one or more external electronic devices (e.g., the external devices 102 and 104, and the server 108) to perform at least a part of the function or the service. The one or more external electronic devices (e.g., the external devices 102 and 104, and the server 108) receiving the request may perform the at least a part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing ("MEC"), or client-server computing technology may be used, for example. The electronic device 101 may provide ultra-low-latency services using distributed computing or mobile edge computing, for example. In an embodiment, the external electronic device 104 may include an Internet-of-things ("IoT") device. The server 108 may be an intelligent server using machine learning and/or a neural network. In an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
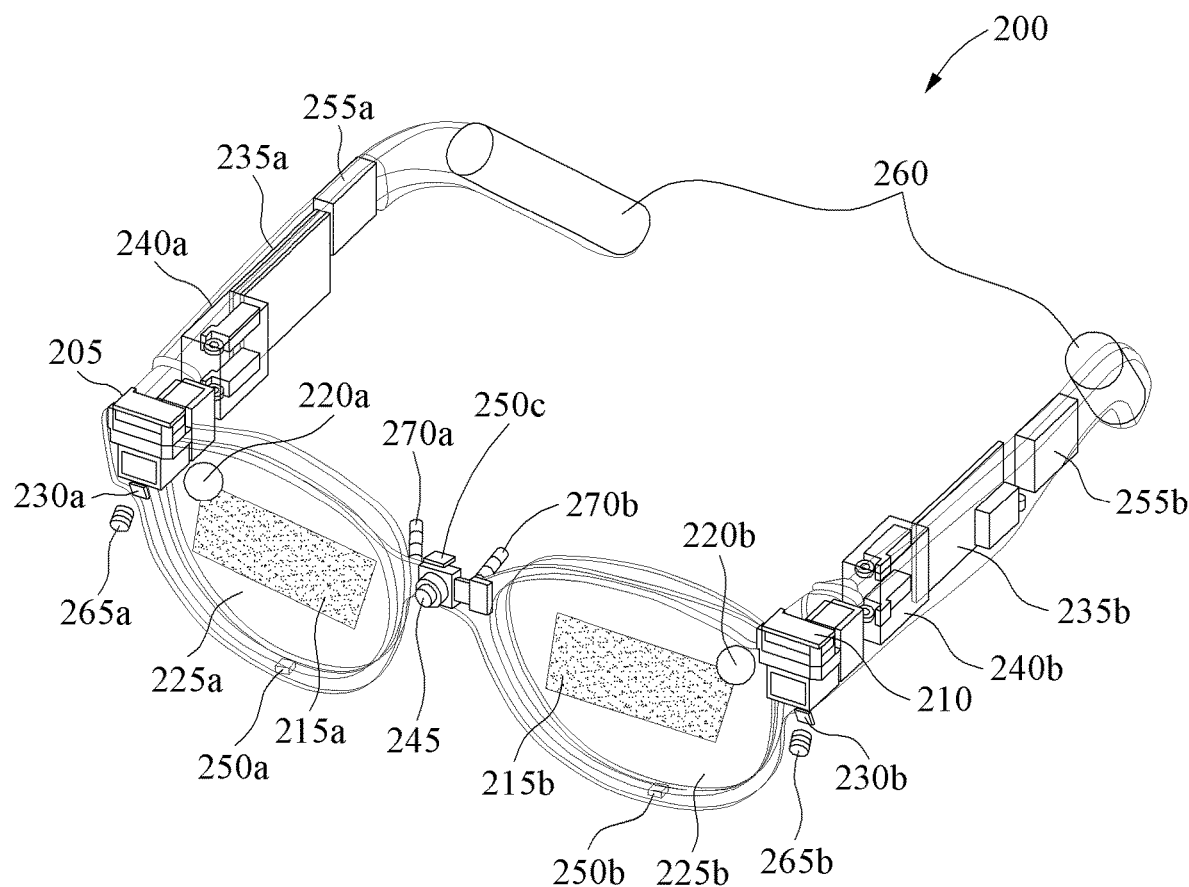
FIG. 2 is a diagram illustrating an embodiment of a structure of a wearable electronic device.

FIG. 2 is a diagram illustrating an embodiment of a structure of a wearable electronic device.

Referring to FIG. 2, the wearable electronic device 200 (e.g., the electronic device 101 or 102 of FIG. 1) may be disposed (e.g., worn) on a face of a user to provide the user with an image associated with an augmented reality ("AR") service and/or a virtual reality ("VR") service.

In an embodiment, the wearable electronic device 200 may include a first display 205, a second display 210, screen display portions 215a and 215b, input optical members 220a and 220b, a first transparent member 225a, a second transparent member 225b, lighting units 230a and 230b, a first PCB 235a, a second PCB 235b, a first hinge 240a, a second hinge 240b, an imaging camera 245, a plurality of microphones (e.g., a first microphone 250a, a second microphone 250b, and a third microphone 250c), a plurality of speakers (e.g., a first speaker 255a, and a second speaker 255b), a battery 260, a first recognition camera 265a, a second recognition camera 265b, a first eye tracking camera 270a, and a second eye tracking camera 270b.

In an embodiment, a display (e.g., the first display 205 and the second display 210) may include a liquid crystal display ("LCD"), a digital mirror device ("DMD"), or a liquid crystal on silicon ("LCoS"), an organic light-emitting diode ("OLED"), a micro light-emitting diode ("micro LED"), or the like, for example. Although not shown in the drawings, when the first display 205 and/or the second display 210 is one of an LCD, a DMD, and an LCoS, the wearable electronic device 200 may include a light source which emits light to a screen output area of the first display 205 and/or the second display 210. In an embodiment, when the first display 205 and/or the second display 210 is capable of generating light by itself (when the first display 205 and/or the second display 210 is either an OLED or a micro-LED, for example), the wearable electronic device 200 may provide a virtual image with a relatively high quality to the user even though a separate light source is not included. In an embodiment, when the first display 205 and/or the second display 210 is implemented as an OLED or a micro-LED, a light source may be unnecessary, and accordingly the wearable electronic device 200 may be lightened, for example. Hereinafter, the first display 205 and/or the second display 210 capable of generating light by itself may be also referred to as a "self-luminous display", and description will be made on the assumption of the self-luminous display.

The first display 205 and/or the second display 210 according to various embodiments may include at least one micro-LED. In an embodiment, the micro-LED may express red (R), green (G), and blue (B) by emitting light by itself, and a single chip may implement a single pixel (e.g., one of R, G, and B pixels) because the micro-LED is relatively small in size (e.g., about 100 micrometer (μm) or less), for example. Accordingly, it may be possible to provide a high resolution without a backlight unit ("BLU"), when the first display 205 and/or the second display 210 is implemented as a micro-LED. However, the invention is not limited thereto, and a single chip may be implemented by a plurality of pixels including R, G, and B pixels. However, the invention is not limited thereto, and the plurality of pixels may include various other color pixels. The first display 205 and/or the second display 210 may be also referred to as a "light source".

A structure and an operation of the first display 205 and/or the second display 210 will be described in more detail below with reference to FIG. 4.

In an embodiment, the first display 205 and/or the second display 210 may include pixels for displaying a virtual image. The first display 205 and/or the second display 210 may further include infrared pixels that emit infrared light.

In an embodiment, the first display 205 and/or the second display 210 may further include light-receiving pixels (e.g., photo sensor pixels) that are disposed between pixels, receive light reflected from eyes of a user, convert the received light to electrical energy, and output the electrical energy. A light-receiving pixel may be also referred to as an "eye tracking sensor". The eye tracking sensor (e.g., an eye tracking sensor 315 of FIG. 3) may sense infrared light generated by reflecting light emitted by an infrared pixel included in the first display 205 and/or the second display 210 by eyes of a user.

The wearable electronic device 200 may detect a gaze direction (e.g., a movement of a pupil) of the user, using light-receiving pixels 315. In an embodiment, the wearable electronic device 200 may detect and track a gaze direction of each of a right eye and a left eye of the user through one or more light-receiving pixels 315 of the first display 205 and one or more light-receiving pixels 315 of the second display 210, for example. The wearable electronic device 200 may also determine a central position of a virtual image 610 (refer to FIGS. 6A and 6B) according to the gaze directions (e.g., directions in which pupils of the right eye and the left eye of the user gaze) detected through the one or more light-receiving pixels 315.

The wearable electronic device 200 may include the first display 205 and/or the second display 210, the first transparent member 225a and/or the second transparent member 225b. A user may use the wearable electronic device 200 while wearing the wearable electronic device 200 on a face of the user. In an embodiment, the first transparent member 225a may face the right eye of the user, and the second transparent member 225b may face the left eye of the user. According to various embodiments, when the first display 205 and/or the second display 210 are transparent, the first display 205 and/or the second display 210 may face the eyes of the user to configure the screen display portions 215a and 215b.

The first display 205 and the second display 210 may each include a first control circuit (not shown). The first control circuit may control the first display 205 and the second display 210. The first control circuit may control an operation of a liquid crystal element of a transparent cover (not shown) included in each of the first display 205 and the second display 210. In an embodiment, light emitted from the first display 205 and/or the second display 210 may reach the screen display portion 215a formed on the first transparent member 225a that faces the right eye of the user, and the screen display portion 215b formed on the second transparent member 225b that faces the left eye of the user, by passing through a lens (not shown) and a waveguide (e.g., a display waveguide 350 and an eye tracking waveguide 360 of FIG. 3).

The lens (not shown) may be disposed in front of the first display 205 and/or the second display 210. The lens (not shown) may include a concave lens and/or a convex lens. In an embodiment, the lens (not shown) may include a projection lens (e.g., a projection lens 325 of FIG. 3), or a collimation lens (not shown), for example.

In an embodiment, the light emitted from the first display 205 and/or the second display 210 may be guided by the display waveguide 350 and/or the eye tracking waveguide 360 through the input optical members 220a and 220b. Light moving into the display waveguide 350 and/or the eye tracking waveguide 360 may be guided toward eyes of a user through an output optical member (e.g., an output optical member 340 of FIG. 3). The screen display portions 215a and 215b may be determined based on light emitted toward an eye of a user (e.g., an eye 301 of the user of FIG. 3).

In an embodiment, the light emitted from the first display 205 and/or the second display 210 may be reflected from a grating area of the display waveguide 350 and/or the eye tracking waveguide 360 formed in the input optical member 220a, 220b and the screen display portion 215a, 215b, and may be transmitted to the eye 301 of the user, for example.

In an embodiment, the screen display portion 215a, 215b or a transparent member (e.g., the first transparent member 225a and the second transparent member 225b) may include a reflective lens, and a lens including the display waveguide 350 and/or the eye tracking waveguide 360. The display waveguide 350 and the eye tracking waveguide 360 may function to transmit a light source generated by the first display 205 and/or the second display 210 to eyes of the user, and may be also referred to as an "optical waveguide". Hereinafter, an "optical waveguide" or "waveguide" may correspond to the screen display portions 215a and 215b.

The screen display portions 215a and 215b may be a path through which external light is incident, totally reflected, and emitted, and may be distinguished from the first transparent member 225a and the second transparent member 225b through which external light is simply reflected or transmitted.

In an embodiment, the screen display portions 215a and 215b may include glass, plastic, or a polymer, and may have a nanopattern formed on one surface of the inside or outside, that is, a grating structure of a polygonal or curved shape. In an embodiment, light incident to one end of the screen display portions 215a and 215b through the input optical member 220a, 220b may be propagated inside the display waveguide 350 by the nanopattern to be provided to the user. In an embodiment, the screen display portions 215a and 215b including a freeform prism may provide incident light to a user through a reflection mirror, for example.

The screen display portions 215a and 215b may include at least one of a reflective element (e.g., a reflection mirror) and at least one diffractive element (e.g., a diffractive optical element ("DOE") or a holographic optical element ("HOE")). The screen display portions 215a and 215b may guide light emitted from a display (e.g., the first display 205 and the second display 210) to the eyes of the user, using the at least one diffractive element or the reflective element included in the screen display portions 215a and 215b.

Figure 3:
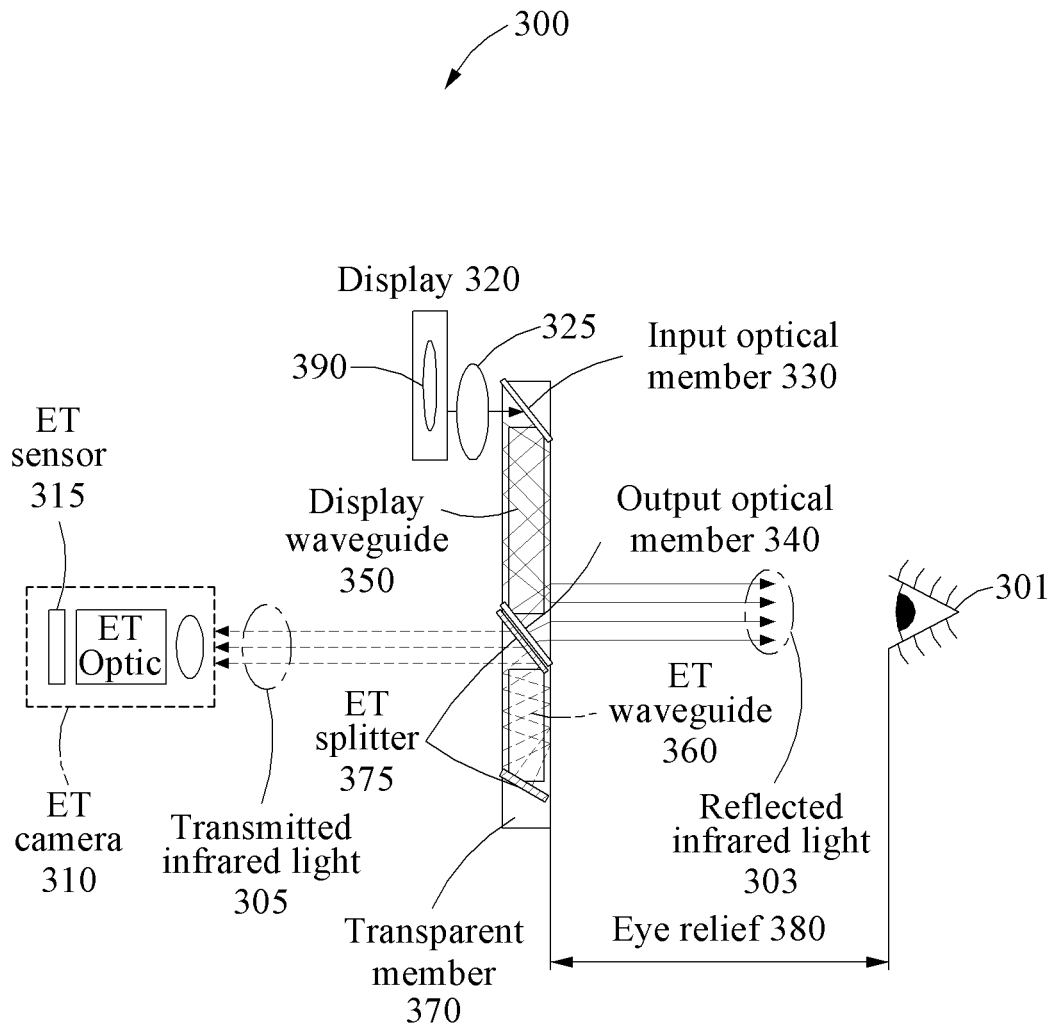
FIG. 3 is a diagram illustrating an embodiment of an operation of an eye tracking camera included in a wearable electronic device.

According to various embodiments, the diffractive element may include the input optical members 220a and 220b and/or an output optical member (e.g., the output optical member 340 of FIG. 3). In an embodiment, the input optical member 220a, 220b may refer to an input grating area, and the output optical member 340 may refer to an output grating area, for example. The input grating area may function as an input terminal to diffract (or reflect) light output from the first display 205 and/or the second display 210 (e.g., a micro LED) to transmit the light to the screen display portions 215a and 215b. The output grating area may function as an exit to diffract (or reflect) light transmitted to the display waveguide 350 and/or the eye tracking waveguide 360 to the eye 301 of the user.

According to various embodiments, the reflective element may include a total reflection optical element or a total reflection waveguide for total internal reflection ("TIR"). In an embodiment, total reflection, which is one of schemes of inducing light, may define an angle of incidence such that light (e.g., a virtual image) entering through the input grating area is completely or almost completely reflected from a portion (e.g., a predetermined surface) of the screen display portions 215a and 215b, to completely or almost completely transmit the light to the output grating area, for example.

The first transparent member 225a and/or the second transparent member 225b may be formed as a glass plate, a plastic plate, or a polymer, and may be transparently or translucently formed, for example. In an embodiment, the first transparent member 225a may face the right eye of the user, and the second transparent member 225b may face the left eye of the user.

The lighting units 230a and 230b may be used differently according to positions in which the lighting units 230a and 230b are attached. In an embodiment, the lighting units 230a and 230b may be attached around a frame of the wearable electronic device 200, for example. The lighting units 230a and 230b may be used as auxiliary devices for facilitating eye-gaze detection when pupils are captured using the first eye tracking camera 270a and the second eye tracking camera 270b. The lighting unit 230a, 230b may use an infrared LED with a visible light wavelength or an infrared light wavelength.

In an alternative embodiment, the lighting unit 230a, 230b may be attached around a hinge (e.g., the first hinge 240a and the second hinge 240b) that connects a temple (e.g., a temple 737 of FIG. 7) and a frame (e.g., a rim 910 of FIGS. 9A and 9B) of the wearable electronic device 200, or around a camera (e.g., the first recognition camera 265a and the second recognition camera 265b) disposed (e.g., mounted) adjacent to a bridge that connects the frame (e.g., the rim 910). In an embodiment, the first recognition camera 265a and the second recognition camera 265b may be global shutter ("GS") cameras, for example, but are not limited thereto.

When capturing is performed using a GS camera, the lighting units 230a and 230b may be used to supplement a surrounding brightness. In an embodiment, the lighting units 230a and 230b may be used in a dark environment or when it is not easy to detect a subject to be captured due to reflected light and mixing of various light sources, for example.

In an alternative embodiment, the lighting units 230a and 230b may be omitted. The lighting units 230a and 230b may be replaced by infrared pixels included in the first display 205 and the second display 210. In an embodiment, the lighting units 230a and 230b may be included in the wearable electronic device 200 to assist infrared pixels included in the first display 205 and the second display 210.

A PCB (e.g., the first PCB 235a and the second PCB 235b) may be disposed in the temple (e.g., the temple 737) of the wearable electronic device 200, and may transmit an electric signal to each module (e.g., camera, display, audio, or sensor modules) and another PCB through a flexible printed circuit board ("FPCB"). According to various embodiments, at least one PCB may include the first PCB 235a, the second PCB 235b, and an interposer (not shown) disposed between the first PCB 235a and the second PCB 235b.

In an embodiment, a control circuit (not shown) for controlling components of the wearable electronic device 200 other than the first display 205 and the second display 210 may be disposed on a PCB (e.g., the first PCB 235a and the second PCB 235b). The control circuit may control components other than the first display 205 and the second display 210 and perform an operation such as depth value estimation. The control circuit may include a communication circuit (e.g., the communication module 190 of FIG. 1) or a memory (e.g., the memory 130 of FIG. 1). The control circuit may control the first display 205, the second display 210, and/or the other components.

The first hinge 240a and/or the second hinge 240b may correspond to a portion where the frame (e.g., the rim 910 of FIGS. 9A and 9B) and the temple (e.g., the temple 737) of the wearable electronic device 200 are coupled.

In an embodiment, the imaging camera 245 may be also referred to as a "high resolution ("HR")" or a "photo video ("PV")", and may include a high-resolution camera. The imaging camera 245 may include a color camera having functions for obtaining a high-quality image, such as an automatic focus ("AF") function and an optical image stabilizer ("OIS"). The invention is not limited thereto, and the imaging camera 245 may include a GS camera or a rolling shutter ("RS") camera.

In an embodiment, a plurality of microphones (e.g., the first microphone 250a, the second microphone 250b, and the third microphone 250c) may convert an external acoustic signal into electrical audio data. The electrical audio data may be variously utilized according to a function (or an application being executed) being performed by the wearable electronic device 200.

In an embodiment, a plurality of speakers (e.g., the first speaker 255a and the second speaker 255b) may output audio data that is received from a communication circuit (e.g., the communication module 190 of FIG. 1) or stored in a memory (e.g., the memory 130 of FIG. 1).

In an embodiment, one or more batteries 260 may be included, and may supply power to components constituting the wearable electronic device 200.

In an embodiment, the first recognition camera 265a and the second recognition camera 265b may include cameras used for three degrees of freedom ("3DoF") and six degrees of freedom ("6DoF") head tracking, hand detection and tracking, and gesture and/or space recognition. In an embodiment, the first recognition camera 265a and the second recognition camera 265b may each include a GS camera to detect a movement of a head or a hand and track the movement, for example. In an embodiment, a stereo camera may be used for head tracking and space recognition, and accordingly two GS cameras with the same standard and performance may be used, for example. An RS camera may be used to detect a quick hand movement and a minute movement of a finger and track a movement. In an embodiment, a GS camera having superior performance (e.g., image drag) in comparison to a camera may be mainly used, however, the invention is not limited thereto. According to various embodiments, an RS camera may be used. The first recognition camera 265a and the second recognition camera 265b may perform space recognition for 6DoF and a simultaneous localization and mapping ("SLAM") function through depth imaging. In addition, the first recognition camera 265a and the second recognition camera 265b may perform a user gesture recognition function.

In an embodiment, at least one sensor (not shown), e.g., a gyro sensor, an acceleration sensor, a geomagnetic sensor, and/or a gesture sensor, the first recognition camera 265a, and the second recognition camera 265b may perform at least one of head tracking for 6DoF, pose estimation and prediction, gesture and/or space recognition, and a function of a SLAM through depth imaging.

In an embodiment, the first recognition camera 265a and the second recognition camera 265b may be classified and used as a camera for head tracking and a camera for hand tracking.

In an embodiment, the first eye tracking camera 270a and the second eye tracking camera 270b may detect and track pupils. The first eye tracking camera 270a and the second eye tracking camera 270b may be used to allow a center of a virtual image projected onto the wearable electronic device 200 to be disposed based on a direction in which a pupil of a user wearing the wearable electronic device 200 gazes. In an embodiment, as the first eye tracking camera 270a and the second eye tracking camera 270b, a GS camera may be mainly used to detect a pupil and track a fast pupil movement, for example. The first eye tracking camera 270a may be installed to correspond to the right eye of the user, and the second eye tracking camera 270b may be installed to correspond to the left eye of the user. Here, the first eye tracking camera 270a and the second eye tracking camera 270b may have the same camera performance and specifications, however, the invention is not limited thereto. An operation of an eye tracking camera (e.g., the first eye tracking camera 270a and the second eye tracking camera 270b) will be described in more detail below with reference to FIG. 3.

FIG. 3 is a diagram illustrating an embodiment of an operation of an eye tracking camera included in a wearable electronic device. FIG. 3 illustrates a process in which an eye tracking camera 310 (e.g., the first eye tracking camera 270a and the second eye tracking camera 270b of FIG. 2) of a wearable electronic device 300 in an embodiment tracks the eye 301 of the user, that is, a gaze of the user, using light (e.g., infrared light) output from a display 320 (e.g., the first display 205 and the second display 210 of FIG. 2).

The eye tracking camera (also indicated as ET camera in FIG. 3) 310 may include the eye tracking sensor (also indicated as ET sensor in FIG. 3) 315. The eye tracking sensor 315 may be included inside the eye tracking camera 310. The eye tracking sensor 315 may detect first reflected light that is generated by reflecting reflected infrared light 303 from the eye 301 of the user. The eye tracking camera 310 may track the eye 301 of the user, that is, the gaze of the user, based on a detection result of the eye tracking sensor 315.

The display 320 may include a plurality of visible light pixels and a plurality of infrared pixels. The visible light pixels may include R, G, and B pixels. However, the invention is not limited thereto, and the visible light pixels may include various other color pixels. The visible light pixels may output visible light corresponding to a virtual object image. The infrared pixels may output infrared light. In an embodiment, the display 320 may include micro LEDs, or OLEDs, for example.

The wearable electronic device 300 may perform gaze tracking using the infrared light output from the display 320. The projection lens 325 (e.g., a projection lens 415 of FIG. 4) may be disposed between the display 320 and an input optical member 330 (e.g., the input optical members 220a and 220b of FIG. 2).

The infrared light output from the display 320 may be incident on the input optical member 330 through the projection lens 325, and may be separated into reflected infrared light 303 and transmitted infrared light 305 by a half mirror (not shown) included in the input optical member 330.

The half mirror may be formed in the entire area or a partial area of the input optical member 330. When the half mirror is formed in the entire area of the input optical member 330, the input optical member 330 may be also referred to as a "half mirror". The half mirror may be disposed in the input optical member 330 of the display waveguide 350. The half mirror may be disposed inside or below the input optical member 330. The half mirror may include a grating structure.

The half mirror may output reflected infrared light and transmitted infrared light in response to the infrared light output from the display 320. The half mirror may include a grating structure. The grating structure may output reflected infrared light directed toward the eye 301 of the user by reflecting a portion of the output infrared light, or may output the reflected infrared light 303 toward the eye 301 of the user through the output optical member 340 by passing through the display waveguide 350. Also, the grating structure may output the transmitted infrared light 305 by transmitting another portion of the output infrared light.

The reflected infrared light 303 may be output directly toward the eye 301 of the user. The reflected infrared light 303 may be output toward the eye 301 of the user through the output optical member 340 by passing through the display waveguide 350. The transmitted infrared light 305 may be output toward the real world. The transmitted infrared light 305 may be incident on the real object and may be partially reflected from the real object.

The display waveguide 350 and the eye tracking waveguide (also indicated as ET waveguide in FIG. 3) 360 may be included in a transparent member 370 (e.g., the first transparent member 225a and the second transparent member 225b of FIG. 2). In an embodiment, the transparent member 370 may be formed as a glass plate, a plastic plate, or a polymer, and may be transparently or translucently formed, for example. The transparent member 370 may face an eye of a user. In this case, a distance between the transparent member 370 and the eye 301 may be also referred to as an "eye relief" 380.

The transparent member 370 may include the display waveguide 350 and the eye tracking waveguide 360. The transparent member 370 may include the input optical member 330 and the output optical member 340. In addition, the transparent member 370 may include an eye tracking splitter (also indicated as ET tracking splitter in FIG. 3) 375 for splitting input light into multiple waveguides.

The display waveguide 350 is separated from the input optical member 330 as shown in FIG. 3, however, this is merely one of embodiments. In another embodiment, the input optical member 330 may be included in the display waveguide 350.

In addition, the output optical member 340 is separated from the eye tracking waveguide 360, as shown in FIG. 3, however, this is merely one of embodiments. In another embodiment, the output optical member 340 may be included in the eye tracking waveguide 360.

An optical waveguide (e.g., the display waveguide 350 and the eye tracking waveguide 360) may output a virtual object image by adjusting a path of visible light. Visible light and infrared light output from the display 320 may be incident on the input optical member 330 through the projection lens 325. Visible light among light incident on the input optical member 330 may be totally reflected through the display waveguide 350 to be guided to the output optical member 340. The visible light may be output from the output optical member 340 toward the eye 301 of the user.

The wearable electronic device 300 may reflect or transmit the infrared light output from the display 320 through the half mirror. In an embodiment, the wearable electronic device 300 may output the reflected infrared light 303 that is reflected by the half mirror (not shown) directly toward the eye 301 of the user, or may output the reflected infrared light 303 passing through the display waveguide 350 toward the eye 301 of the user. In an embodiment, the wearable electronic device 300 may output the transmitted infrared light 305 passing through the half mirror toward the real object. A reflectivity and a transmittance of the half mirror may be adjusted. In an embodiment, the half mirror may have a reflectivity of about 30% (e.g., reflection toward eyes of a user) and a transmittance of about 70% (e.g., output toward a real object) with respect to infrared light, for example. However, the reflectivity and the transmittance are merely some of embodiments and may be adjusted in various ratios in other embodiments.

In an embodiment, the wearable electronic device 300 may output the reflected infrared light 303 toward eyes of the user through the half mirror and the infrared pixels included in the display 320. The reflected infrared light 303 may be reflected from the eye 301 of the user, and the eye tracking sensor 315 may detect the reflected light. The display 320 including the infrared pixels, and the half mirror included in the display waveguide 350 may be used instead of a separate infrared light source for detecting a real object. Since the separate infrared light source is not used, the wearable electronic device 300 may be lightened and power consumption may be reduced. In addition, the display 320 including the infrared pixels may function as an auxiliary light source to increase an image quality of a stereo camera (e.g., the first recognition camera 265a and the second recognition camera 265b of FIG. 2) in a low-illuminance environment and increase an accuracy of depth information.

In an alternative embodiment, the wearable electronic device 300 may output infrared light through the display 320 and detect light reflected from the real object through a stereo camera (e.g., the first recognition camera 265a and the second recognition camera 265b of FIG. 2). The wearable electronic device 300 may estimate a distance to the real object based on a detection result. In an embodiment, the wearable electronic device 300 may measure a depth value or use a time of flight ("ToF") scheme to estimate the distance to the real object, for example.

The wearable electronic device 300 (e.g., the wearable electronic device 200 of FIG. 2) may provide AR to a user. The wearable electronic device 300 may provide an image representing the real world through the transparent eye tracking waveguide 360, while transferring a virtual object image output from the display 320 toward eyes of the user through the display waveguide 350.

The wearable electronic device 300 may include a head-mounted display ("HMD"), a face-mounted display ("FMD"), or a smart glass or a headset that provides extended reality such as AR, VR, or mixed reality, for example, but is not limited thereto.

In an embodiment, the wearable electronic device 300 may output infrared light using the display 320 including the infrared pixels. The wearable electronic device 300 may track a gaze of a user, using the infrared light output from the display 320. In addition, the wearable electronic device 300 may estimate a distance to a real object, using the infrared light output from the display 320.

In an embodiment, the display 320 may include micro-reflection mirrors 390.

Figure 4:
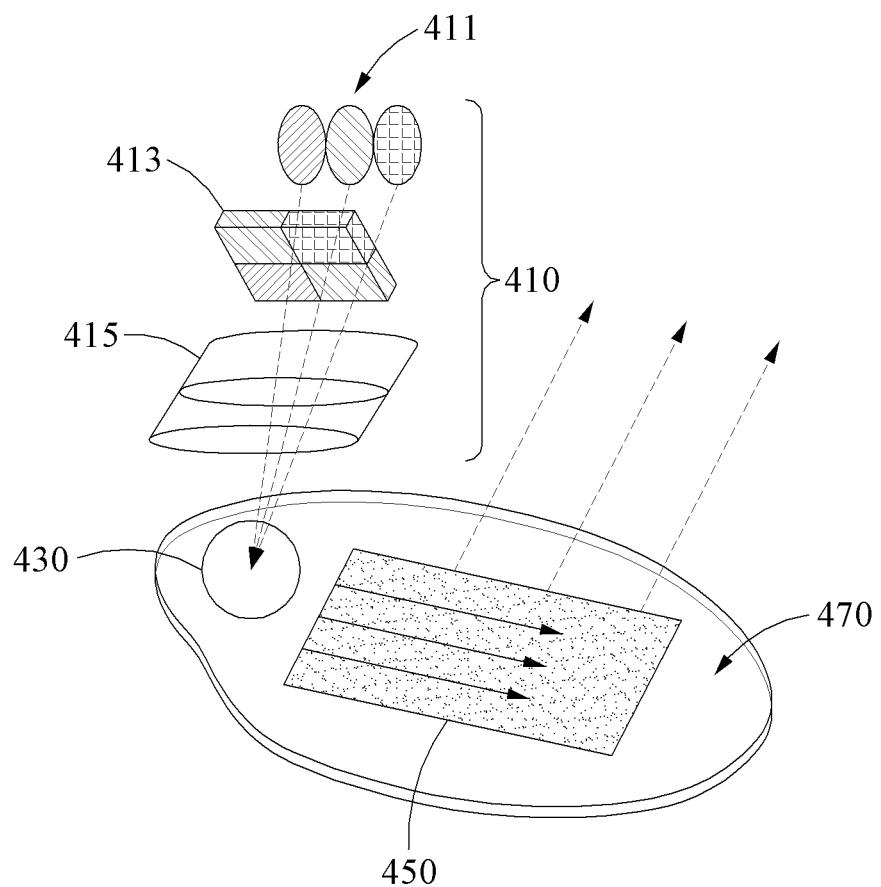
FIG. 4 is a diagram illustrating an embodiment of operations of a display and screen display portions of a wearable electronic device.

FIG. 4 is a diagram illustrating an embodiment of operations of a display and screen display portions of a wearable electronic device. FIG. 4 illustrates an embodiment of a display 410 (e.g., the first display 205 and the second display 210 of FIG. 2 and the display 320 of FIG. 3) and a screen display portion 450 (e.g., the screen display portions 215a and 215b of FIG. 2) of a wearable electronic device (e.g., the wearable electronic device 200 of FIG. 2 and the wearable electronic device 300 of FIG. 3). The display 410 may be also referred to as a "display module."

The display 410 may output a virtual image (e.g., the virtual image 610 of FIGS. 6A and 6B) to be used to evaluate deformation of the screen display portion 450. The virtual image may be a resolution evaluation chart such as a Photographic and Imaging Manufacturers Association ("PIMA") chart or a circular zone plate chart, for example, but is not necessarily limited thereto.

The display 410 may include a light source 411, a display device 413, and a projection lens 415.

In an embodiment, when the display device 413 is a digital light processor ("DLP") that implements high-precision display of an image using a DMD chip or an LCoS in which liquid crystal is installed on a backplane formed on a silicon wafer, for example, the light source 411 may include a plurality of visible light pixels and a plurality of infrared pixels. The visible light pixels may include R, G, and B pixels. However, the invention is not limited thereto, and the visible light pixels may include various other color pixels. The visible light pixels may output visible light corresponding to a virtual object image. The infrared pixels may output infrared light.

In an embodiment, the display device 413 may include micro LEDs, or OLEDs, for example.

Light output through the light source 411 may be transmitted to an input optical member 430 through the display device 413 and the projection lens 415. In an embodiment, the display device 413 may include a self-luminous device (e.g., micro LEDs, or OLEDs) that does not desire the light source 411.

The virtual image 610 output through the display 410 may be transmitted to the screen display portion 450 through the projection lens 415 (e.g., the projection lens 325 of FIG. 3) and the input optical member 430 (e.g., the input optical members 220a and 220b of FIG. 2 and the input optical member 330 of FIG. 3). The input optical member 430 may refer to an input grating area. The input optical member 430 may function as an input terminal to diffract (or reflect) light output from the display 410. Light received from the input optical member 430 may be transmitted to an output optical member (e.g., the output optical member 340 of FIG. 3) through a total reflection. The output optical member 340 may refer to an "output grating area". The output optical member 340 may function as an exit to diffract (or reflect) light transferred through a total reflection waveguide to eyes of a user.

The virtual image 610 transmitted to the screen display portion 450 may be projected onto a flat surface or a portion (e.g., a portion 511 of FIG. 5) of an interior of a case (e.g., a case 510 of FIG. 5) that functions as a screen, through a focal lens (e.g., a focal lens 515 of FIG. 5) in the case (e.g., the case 510) in which the wearable electronic device 200, 300 is disposed (e.g., seated).

The wearable electronic device 200, 300 may capture the virtual image 610 projected onto the portion 511 of the case 510, using eye tracking cameras for a left eye and a right eye (e.g., the first eye tracking camera 270a and the second eye tracking camera 270b of FIG. 2) fixed to a rim (e.g., a rim 910 of FIGS. 9A and 9B) that encloses a transparent member 470 (e.g., the first transparent member 225a and the second transparent member 225b of FIG. 2). An image processor (e.g., the processor 120 of FIG. 1) included in the wearable electronic device 200, 300 may compare images captured by the eye tracking cameras (e.g., the first eye tracking camera 270a and the second eye tracking camera 270b of FIG. 2) to each other.

Figure 5:
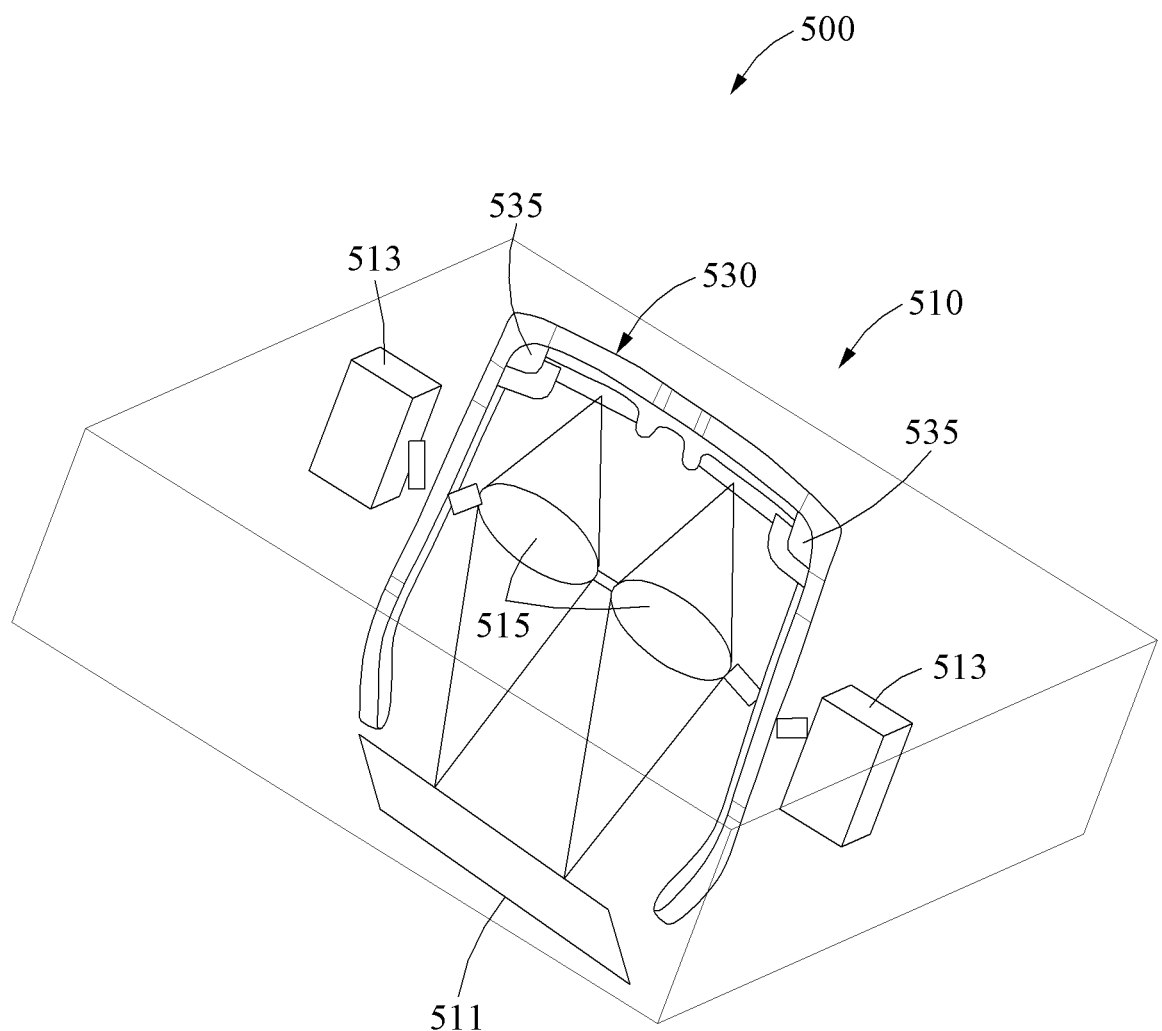
FIG. 5 is a diagram illustrating an embodiment of a structure of an adjustment device including a wearable electronic device and a case.

FIG. 5 is a diagram illustrating an embodiment of an adjustment device including a wearable electronic device and a case. FIG. 5 illustrates a structure of an adjustment device 500 for adjusting a deviation through a wearable electronic device 530 and the case 510.

The wearable electronic device 530 may be seated in the case 510. The case 510 may include a stator 513 and the focal lens 515.

The stator 513 may fix the wearable electronic device 530 in the case 510. As shown in FIG. 5, the stator 513 may fix a temple (e.g., the temple 737 of FIG. 7) of the wearable electronic device 530, or a frame (e.g., the rim 910 of FIGS. 9A and 9B) of the wearable electronic device 530. The stator 513 may fix at least a portion of the wearable electronic device 530 to adjust a deviation.

The focal lens 515, instead of eyes of a user, may help output beams of screen display portions of the wearable electronic device 530 seated in the case 510 form an image on the flat surface of the case 510 or the portion 511 of the case 510. More specifically, in the case 510, the focal lens 515 may be disposed within an eye relief of the wearable electronic device 530 fixed by the stator 513, to allow an image of a virtual image (e.g., the virtual image 610 of FIGS. 6A and 6B) transmitted to each of the screen display portions (e.g., the screen display portions 215a and 215b of FIG. 2) of the wearable electronic device 530 to be formed on the portion 511 of the case 510. In this case, the virtual image 610 may be output through displays 535 (e.g., the first display 205 and the second display 210 of FIG. 2). An embodiment of the virtual image 610 will be described in more detail below with reference to FIGS. 6A and 6B.

The portion 511 of the case 510 on which the image is formed may be a flat surface without a curvature to be used as a screen. Portions other than the portion 511 of the case 510 may be matt-coated, non-reflective-coated, or black-painted, to prevent unnecessary light from being diffusely reflected and mixed into an eye tracking camera.

The wearable electronic device 530 may capture an image obtained by projecting the virtual image 610 for measuring a deviation between the screen display portions 215a and 215b onto the portion 511 of the case 510 using the eye tracking cameras (e.g., the first eye tracking camera 270a and the second eye tracking camera 270b of FIG. 2), and may adjust the screen display portions 215a and 215b based on a comparison result of the captured images.

Figure 10:
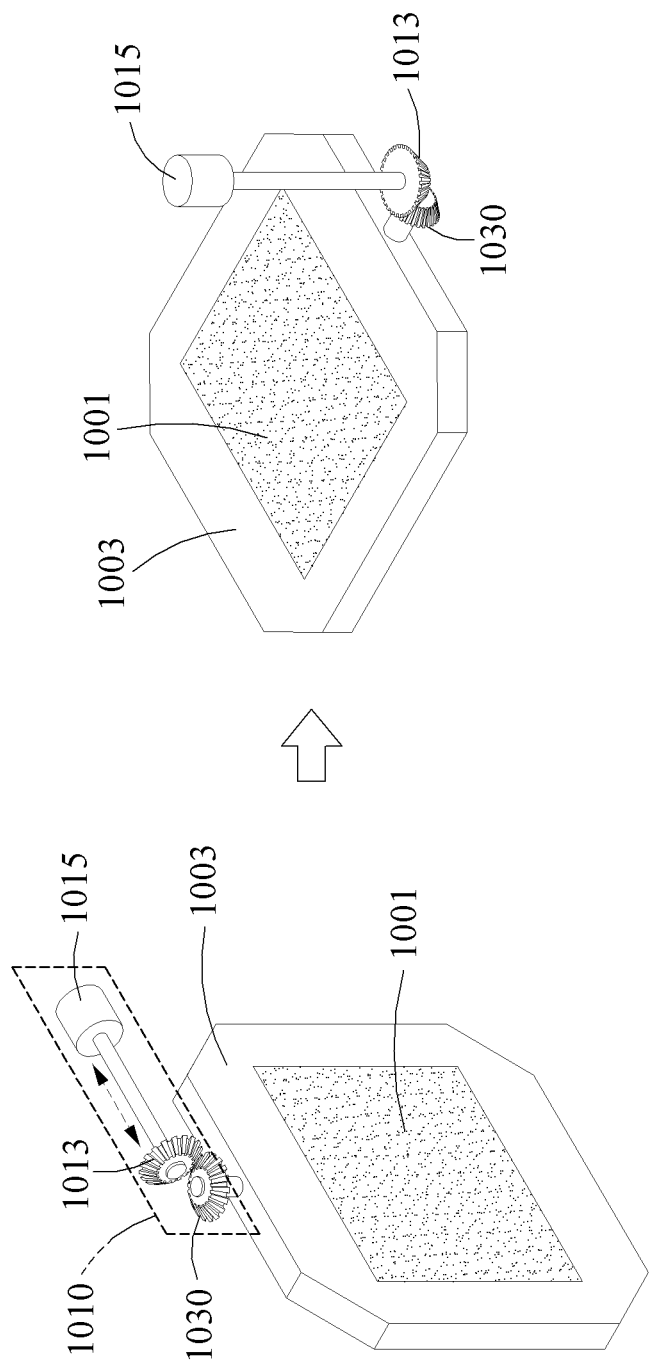

In addition, the wearable electronic device 530 may further include a processor (e.g., the processor 120 of FIG. 1) and a driving device (e.g., a driving device 813 of FIGS. 8A and 8B, driving devices 920 and 930 of FIGS. 9B and 9C, and a driving device 1010 of FIG. 10). The processor 120 may process images captured by the first eye tracking camera 270a and the second eye tracking camera 270b and calculate the deviation between the screen display portions 215a and 215b. The driving device 813, 920, 930, 1010 may adjust the screen display portions 215a and 215b based on the deviation calculated by the processor 120. The wearable electronic device 530 may control the screen display portions 215a and 215b by controlling the driving device 813, 920, 930, 1010 such that the deviation between the screen display portions 215a and 215b may be minimized.

The processor 120 may calculate a number of lines of the virtual image 610 for measuring the deviation and a width of each of the lines from each of the captured images. The processor 120 may determine whether to adjust the deviation between the screen display portions 215a and 215b based on a result of comparing the number and width of the lines of the virtual image 610 to a predetermined threshold. The processor may perform calibration on the left and right eyes of the screen display portions 215a and 215b based on a determination to adjust the deviation between the screen display portions 215a and 215b.

In an embodiment, an image of the virtual image 610 displayed on the screen display portions 215a and 215b of the wearable electronic device 530 may be allowed to be formed on the portion 511 of the case 510 without a curvature, using the focal lens 515 disposed within an eye relief (e.g., the eye relief 380 of FIG. 3) of the wearable electronic device 530 seated based on a position of the stator 513 in the case 510, so that a deviation between the left eye and the right eye may be measured even though there is no separate checkerboard chart.

In addition, in an embodiment, a degree (e.g., a deviation) to which the screen display portions 215a and 215b deviate may be measured by images captured using the first eye tracking camera 270a and the second eye tracking camera 270b included in the wearable electronic device 530, even though there is no separate capturing device, and the screen display portions 215a and 215b may be adjusted to minimize the deviation.

When it is determined that the wearable electronic device 530 is seated in the case 510, the wearable electronic device 530 may transmit the virtual image 610 to adjust the deviation. Whether the wearable electronic device 530 is seated in the case 510 may be determined based on whether charging of the wearable electronic device 530 seated in the case 510 starts, whether a sensor for sensing a hole (e.g., a hole 815 of FIG. 8A) of the driving device 813 senses whether a shaft 831 of a wearable electronic device 830 of FIG. 8A is fastened or coupled to the hole 815, or may be determined through power line communication ("PLC") or short-distance communication between the case 510 and the wearable electronic device 530, for example.

When the wearable electronic device 530 is seated in the case 510, the processor 120 of the wearable electronic device 530 may transmit a virtual image for adjusting a deviation to the portion 511 of the case 510. In an embodiment, deviation adjustment may be performed every time the wearable electronic device 530 is seated in the case 510, or may be performed at regular intervals, for example.

In an embodiment, in addition to adjusting of the deviation between the screen display portions 215a and 215b, the wearable electronic device 530 may pre-store reference image information used to determine whether to adjust a deviation and may independently correct a left image and a right image of the screen display portions 215a and 215b based on the reference image information.

Although an example in which the temple (e.g., the temple 737) of the wearable electronic device 530 is unfolded is described above with reference to FIG. 5, the invention is not limited thereto. In an embodiment, the temple (e.g., the temple 737) of the wearable electronic device 530 may be folded and the wearable electronic device 530 may be seated, thereby reducing the size and weight of the case 510, for example. An example in which the wearable electronic device 530 with the folded temple (e.g., the temple 737) is seated in the case 510 will be described in more detail below with reference to FIG. 7.

Figure 6A:
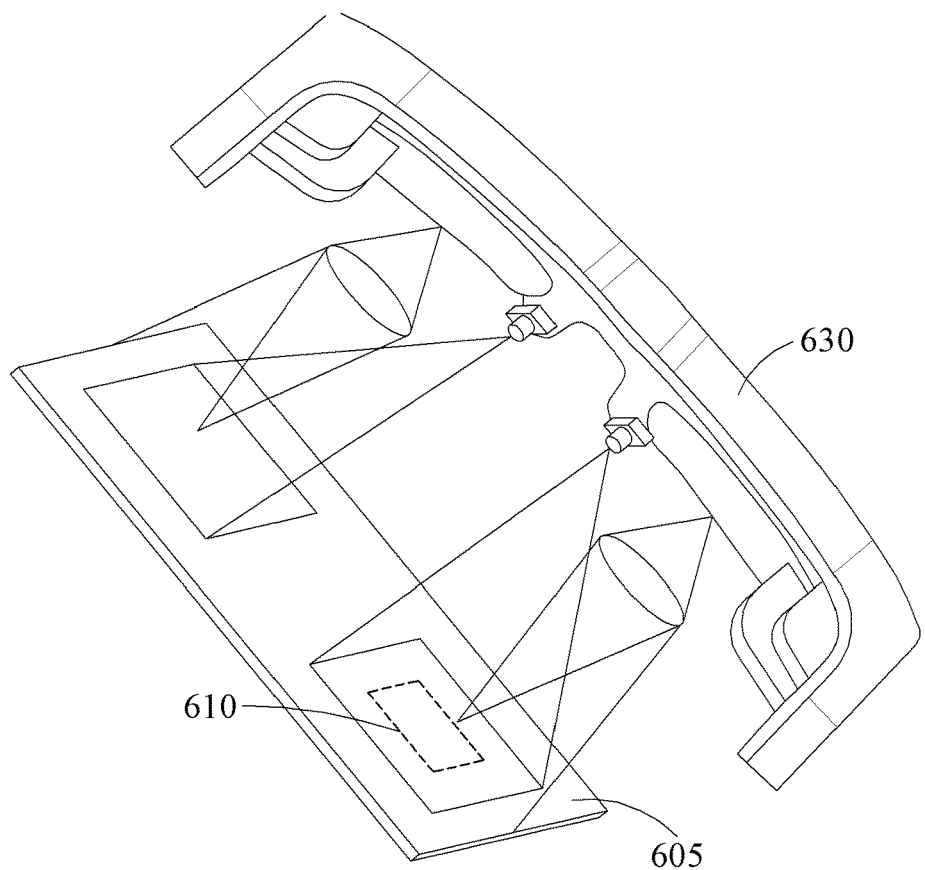
FIG. 6A is a diagram illustrating an embodiment of a virtual image projected by an adjustment device, and 6B is an enlarged view of a portion indicated by a dot-dash line in FIG. 6A.

FIG. 6A is a diagram illustrating an embodiment of a virtual image projected by an adjustment device, and 6B is an enlarged view of a portion indicated by a dot-dash line in FIG. 6A. FIG. 6A illustrates an embodiment of the virtual image 610 projected onto a portion 605 (e.g., the portion 511 of FIG. 5, and a portion 711 of FIG. 7) of an interior of a case.

Figure 6B:
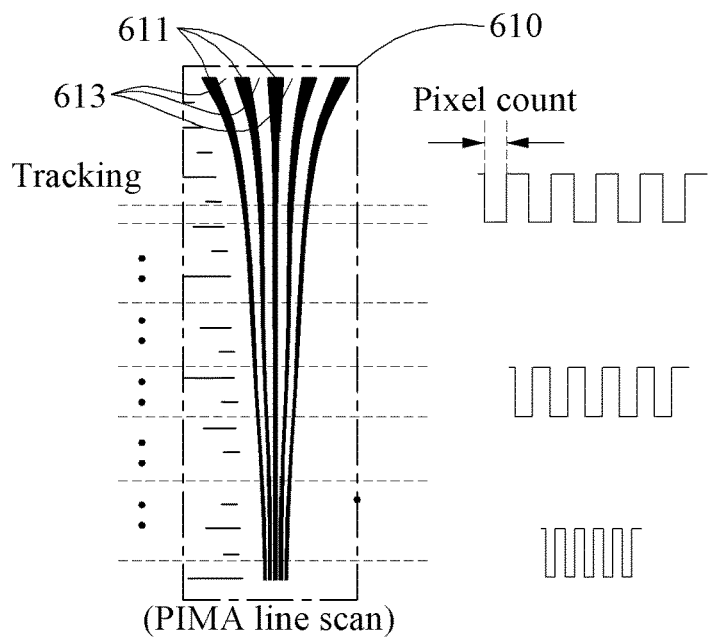

In an embodiment, the virtual image 610 may be a PIMA chart, for example, as shown in FIGS. 6A and 6B. In an alternative embodiment, the virtual image 610 may be a circular zone plate chart, or various charts available for resolution evaluation. Hereinafter, the PIMA chart will be mainly described for convenience of description, however, the invention is not limited thereto.

The PIMA chart may be used to measure a resolution. In the virtual image 610, vertical black lines 611 and white lines 613 may correspond to PIMA lines. Also, a gap between the black lines 611 and the white lines 613 may correspond to a width of a PIMA line.

An image processor (e.g., the processor 120 of FIG. 1) of a wearable electronic device 630 may calculate a number of PIMA lines and a width of each of the PIMA lines from images captured by eye tracking cameras (e.g., the first eye tracking camera 270a and the second eye tracking camera 270b of FIG. 2), which will be described in more detail below with reference to FIG. 12. Here, the width of the PIMA line may correspond to a number of pixels, that is, a minimum number of pixels to be recognized as the black lines 611 and the white lines 613. Also, the number of PIMA lines may correspond to a number of black lines 611 and white lines 613 and may refer to a frequency. The number of PIMA lines and the width of the PIMA lines may be used to determine a resolution including a minimum number of pixels to be recognized for each frequency, which may be a criterion for determining whether to align screen display portions of the wearable electronic device 630.

The wearable electronic device 630 may determine whether results obtained by calculating the number of PIMA lines and the width of each of the PIMA lines exceed a predetermined threshold, by comparing the results to each other. Here, the determining of whether the results exceed the predetermined threshold may indicate how many lines in pairs of black lines 611 and white lines 613 may be read, that is, may be a criterion for determining a resolution. When a comparison result obtained by calculating the number and width of PIMA lines in the images respectively captured by the first eye tracking camera 270a and the second eye tracking camera 270b exceeds a predetermined threshold, the wearable electronic device 630 may align the screen display portions (e.g., the screen display portions 215a and 215b of FIG. 2).

Figure 7:
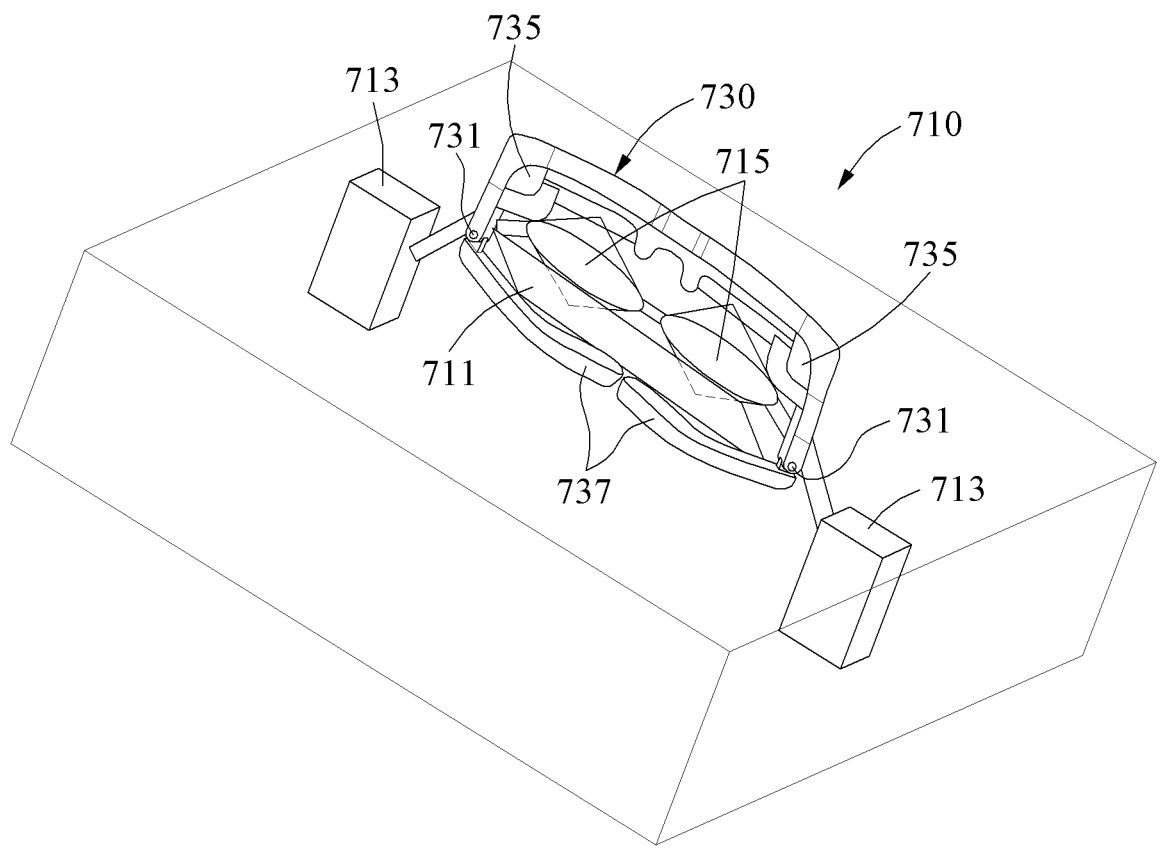
FIG. 7 is a diagram illustrating another embodiment of a structure of an adjustment device including a wearable electronic device and a case.

FIG. 7 is a diagram illustrating another embodiment of a structure of an adjustment device including a wearable electronic device and a case. FIG. 7 illustrates a wearable electronic device with folded temples 737 seated in a case (e.g., the case 510 of FIG. 5).

As shown in FIG. 7, in a state in which a hinge 731 (e.g., the first hinge 240a and the second hinge 240b of FIG. 2) of a wearable electronic device 730 is folded and the temples 737 are gathered, the wearable electronic device 730 is seated in a case 710. Here, image capturing may be hindered due to the temples 737. In an embodiment, a focal lens 715 (e.g., the focal lens 515 of FIG. 5) may be moved toward to screen display portions (e.g., the screen display portions 215a and 215b of FIG. 2) of the wearable electronic device 730, in comparison to the embodiment of FIG. 5. In addition, a portion 711 on which an image of a virtual image (e.g., the virtual image 610 of FIGS. 6A and 6B) output from each of the screen display portions (e.g., the screen display portions 215a and 215b of FIG. 2) of the wearable electronic device 730 may be disposed between the folded temple 737 and the focal lens 715. Here, the virtual image 610 may be output through displays 735 (e.g., the first display 205 and the second display 210 of FIG. 2). In an embodiment, the focal lens 715 may include a lens having a short focal distance such as a high refractive lens, but is not limited thereto.

In an embodiment, the portion 511, 711 on which the image of the virtual image 610 is formed through the focal lens 515, 715 may be fixed at a position in the case 510, 710. In an alternative embodiment, a focal point may be set by a user moving the focal lens 515, 715 or one of the portions 511 and 711 on which images are formed.

FIG. 8A is a diagram illustrating an embodiment of a method of adjusting screen display portions of a wearable electronic device using a driving device included in a case, and FIG. 8B is an enlarged view of a portion indicated by a dotted line in FIG. 8A. FIG. 8A illustrates an embodiment of a stator (e.g., the stator 513 of FIG. 5) of a case 810 further including the driving device 813 for calibration. The driving device 813 may be included in the stator 513 of the case 810 or may correspond to the stator 513 itself. In an embodiment, the driving device 813 may be a motor or a magnet, for example, but is not limited thereto. One driving device 813, or a plurality of driving devices 813 may be provided. In an embodiment, the driving device 813 may include a driving device for a right eye and a driving device for a left eye.

The wearable electronic device 830 may include the shaft 831 coupled to the driving device 813. In an embodiment, the shaft 831 may be provided in each of left and right outer rims (e.g., the rim 910 of FIGS. 9A and 9B) of the wearable electronic device 830 or each of left and right temples (e.g., the temples 737 of FIG. 7), and may include a gear unit, for example. The shaft 831 may be accommodated in the rim 910 or the temple 737. When calibration is performed, the shaft 831 may protrude out of the rim 910 or the temple 737 in the same manner as a push button, and may be fastened to the hole 815 in the driving device 813. In an embodiment, the wearable electronic device 830 may further include a sensor for sensing the hole 815. When the sensor for sensing the hole 815 detects that the shaft 831 of the wearable electronic device 830 is fastened to the hole 815 of the driving device 813, the wearable electronic device 830 may be determined to be seated in the case 810.

When calibration is performed, the shaft 831 may protrude from the rim 910 or the temple 737. When the calibration is completed, the shaft 831 may be accommodated back in the frame (e.g., rim 910) or temple 737.

In an embodiment, the shaft 831 may be coupled to the hole 815 of the driving device 813, for example. When the driving device 813 coupled to the shaft 831 horizontally or vertically moves screen display portions (e.g., the screen display portions 215*a* and 215*b* of FIG. 2) of the wearable electronic device 830, the screen display portions 215*a* and 215*b* may be adjusted or aligned.

The driving device 813 of the stator may be coupled to the shaft 831 of the wearable electronic device 830 to adjust the screen display portions 215*a* and 215*b* based on a deviation between the screen display portions 215*a* and 215*b*.

In an embodiment, when it is determined that the screen display portions (e.g., the screen display portions 215*a* and 215*b* of FIG. 2) need to be aligned based on images captured by each of eye tracking cameras (e.g., the first eye tracking camera 270*a* and the second eye tracking camera 270*b*), the wearable electronic device 830 may transmit information to the case 810 including the driving device 813 through a communication module (e.g., the communication module 190 of FIG. 1). In an embodiment, the case 810 may control the driving device 813 based on the information received from the wearable electronic device 830 to adjust the screen display portions 215*a* and 215*b*.

FIGS. 9A to 9C are diagrams illustrating an embodiment of a method of adjusting screen display portions of a wearable electronic device using a driving device included in the wearable electronic device. FIG. 9B illustrates a magnet 920, a coil 930, and a spring 940 that fix screen display portions 901 (e.g., the screen display portions 215*a* and 215*b* of FIG. 2) and transparent member(s) 903 (e.g., the first transparent member 225*a* and the second transparent member 225*b* of FIG. 2) of a wearable electronic device 900.

The wearable electronic device 900 may further include driving devices 920 and 930 provided in each of the screen display portions 901. The wearable electronic device 900 may adjust, using the driving devices 920 and 930, the screen display portions 901 in directions with six degrees of freedom ("6DOF") (e.g., X, Y, Z, yaw, roll and pitch directions) based on a deviation between the surface display portions 901.

Here, each of the screen display portions 901 may be fixed to the rims 910 of the wearable electronic device 900 for the right eye and the left eye, together with the transparent member 903, by at least one of the magnet 920, the coil 930 and the spring 940. An adjustment device (e.g., the adjustment device 500 of FIG. 5) may adjust the screen display portions 901 of the wearable electronic device 900 based on the deviation, by the magnet 920 and the coil 930 that fix each of the screen display portions 901. In an embodiment, a processor (e.g., the processor 120 of FIG. 1) of the wearable electronic device 900 may adjust the magnet 920 and the coil 930 that fix each of the screen display portions 901, based on images captured by each of eye tracking cameras (e.g., the first eye tracking camera 270*a* and the second eye tracking camera 270*b* of FIG. 2) for the left eye and the right eye, for example.

Examples of operations of the magnet 920, the coil 930 and the spring 940 will be further described below. The adjustment device 500 may control the screen display portions 901 of the wearable electronic device 900 in directions with 6DOF, based on a principle that a force is generated in a direction perpendicular to a magnetic field when a current flows in the coil 930 around the magnet 920.

In an embodiment, the wearable electronic device 900 may further include displays (e.g., the first display 205 and the second display 210 of FIG. 2) including micro-reflection mirrors (e.g., micro-reflection mirrors 390) and projection lenses (e.g., the projection lens 325 of FIG. 3). Here, the wearable electronic device 900 may adjust focal distances of the screen display portions 901 based on the deviation between the screen display portions 901 by adjusting at least one of an output direction and a view angle of light of projection lenses 325, using the micro-reflection mirrors (e.g., micro-reflection mirrors 390).

FIG. 10 is a diagram illustrating an embodiment of a method of adjusting screen display portions of a wearable electronic device using a driving device included in the wearable electronic device. FIG. 10 illustrates the driving device 1010 that is attached to a rim (e.g., the rim 910 of FIGS. 9A and 9B) of a wearable electronic device (e.g., the wearable electronic device 200 of FIG. 2, the wearable electronic device 300 of FIG. 3, the wearable electronic device 530 of FIG. 5, the wearable electronic device 630 of FIG. 6A, the wearable electronic device 730 of FIG. 7, the wearable electronic device 800 of FIG. 8A, and the wearable electronic device 900 of FIG. 9A) in an embodiment to adjust screen display portions 1001 (e.g., the screen display portions 215*a* and 215*b* of FIG. 2, the screen display portion 450 of FIG. 4, and the screen display portions 901 of FIGS. 9A to 9C).

An adjustment device (e.g., the adjustment device 500 of FIG. 5) may adjust the screen display portions 1001 by driving the driving device 1010 of the wearable electronic device 200, 300, 530, 630, 730, 800, 900. The driving device(s) 1010 may be installed on a left rim and a right rim (e.g., the rims 910 of FIGS. 9A and 9B) of the wearable electronic device 200, 300, 530, 630, 730, 800, 900. The adjustment device 500 may be adjusted by the driving device(s) 1010 based on a deviation between the screen display portions 1001 by the driving device(s) 1010 installed on the rims 910 of the wearable electronic device 200, 300, 530, 630, 730, 800, 900.

The driving device(s) 1010 may include a motor 1015, and a second gear unit 1013 that transmits a force driven by the motor 1015.

A first gear unit 1030 provided on one side of the transparent member 1003 including the screen display portion 1001, and the second gear unit 1013 of the driving device 1010 may be coupled to each other, and moved horizontally by the motor 1015, to adjust the screen display portion 1001.

Figure 11:
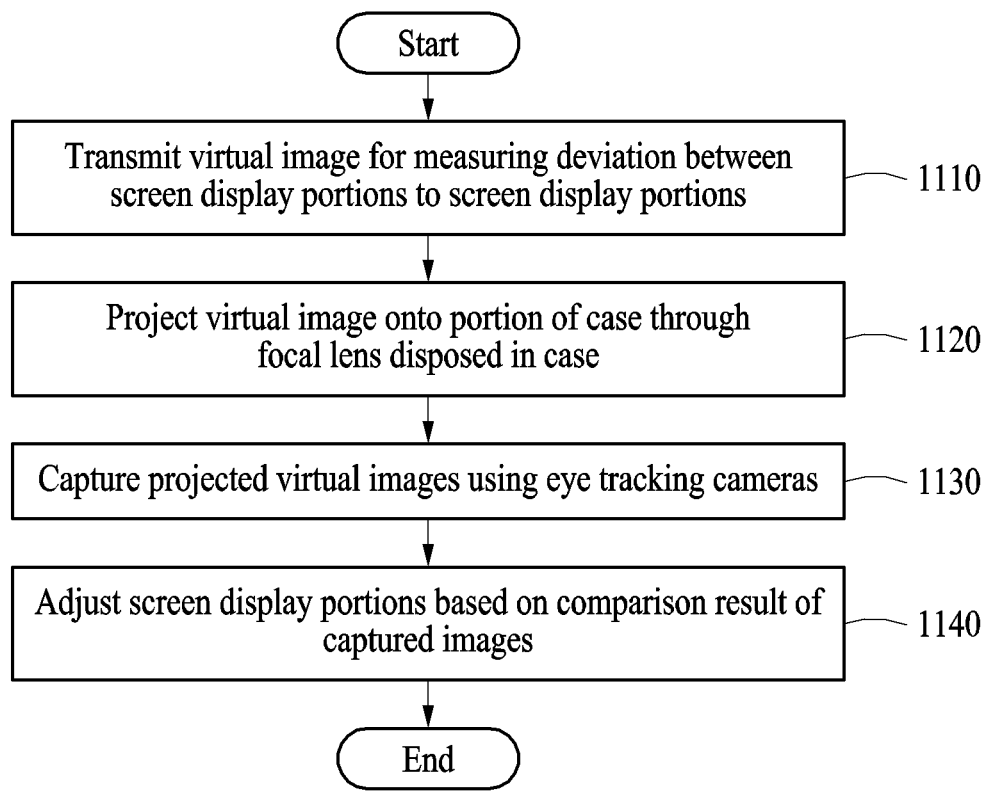
FIG. 11 is a flowchart illustrating an embodiment of a method of operating an adjustment device.

FIG. 11 is a flowchart illustrating an embodiment of a method of operating an adjustment device. In the following examples, operations may be performed sequentially, but not necessarily performed sequentially. In an embodiment, the order of the operations may be changed and at least two of the operations may be performed in parallel, for example.

FIG. 11 illustrates a process in which an adjustment device in an embodiment adjusts screen display portions for a left eye and a right eye, through operations 1110 to 1140. The adjustment device (e.g., the adjustment device 500 of FIG. 5) may include a case (e.g., the case 510 of FIG. 5, the case 710 of FIG. 7, and the case 810 of FIG. 8A) in which a wearable electronic device (e.g., the wearable electronic device 200 of FIG. 2, the wearable electronic device 300 of FIG. 3, the wearable electronic device 530 of FIG. 5, the wearable electronic device 630 of FIG. 6A, the wearable electronic device 730 of FIG. 7, the wearable electronic device 800 of FIG. 8A, and the wearable electronic device 900 of FIG. 9A) that includes screen display portions for a left eye and a right eye (e.g., the screen display portions 215a and 215b of FIG. 2, the screen display portion 450 of FIG. 4, and the screen display portions 901 of FIGS. 9A to 9C) and eye tracking cameras for the left eye and the right eye (e.g., the first eye tracking camera 270a and the second eye tracking camera 270b of FIG. 2) is seated.

In operation 1110, the adjustment device 500 may transmit a virtual image (e.g., the virtual image 610 of FIGS. 6A and 6B) for measuring a deviation between the screen display portions (e.g., the screen display portions 215a and 215b of FIG. 2, the screen display portion 450 of FIG. 4, the screen display portions 901 of FIGS. 9A to 9C) to the screen display portions 215a, 215b, 450, 901. The adjustment device 500 may output the virtual image 610 through displays for the left eye and the right eye (e.g., the first display 205 and the second display 210 of FIG. 2, the display 320 of FIG. 3, the display 410 of FIG. 4, the display 535 of FIG. 5, and the display 735 of FIG. 7) of the wearable electronic device 200, 300, 530, 630, 730, 800, 900, to transmit the virtual image 610 to the screen display portions 215a, 215b, 450, 901. In addition, the adjustment device 500 may transmit the virtual image 610 to the screen display portions 215a, 215b, 450, 901 through a projection lens (e.g., the projection lens 325 of FIG. 3, and the projection lens 415 of FIG. 4) and an input optical member (e.g., the input optical members 220a and 220b of FIG. 2, the input optical member 330 of FIG. 3, and the input optical member 430 of FIG. 4) of the wearable electronic device 200, 300, 530, 630, 730, 800, 900. Here, the virtual image 610 may include at least one of a PIMA chart and a circular zone plate chart for resolution evaluation.

In operation 1120, the adjustment device 500 may project the virtual image 610 onto a portion (e.g., the portion 511 of FIG. 5, the portion 605 of FIG. 6A, and the portion 711 of FIG. 7) of the case 510, 710, 810 through a focal lens (e.g., the focal lens 515 of FIG. 5, and the focal lens 715 of FIG. 7) disposed in the case 510, 710, 810.

In operation 1130, the adjustment device 500 may capture virtual images 610 projected onto the portions 511, 605, and 711 of the cases 510, 710, and 810 in operation 1120, using the first eye tracking camera 270a and the second eye tracking camera 270b.

In operation 1140, the adjustment device 500 may adjust the screen display portions 215a, 215b, 450, 901 based on a comparison result of the images captured in operation 1130. The adjustment device 500 may process the images captured in operation 1130 to calculate a deviation between the screen display portions 215a, 215b, 450, 901. The adjustment device 500 may adjust the screen display portions 215a, 215b, 450, 901 based on the deviation. In an embodiment, the adjustment device 500 may adjust the screen display portions 215a, 215b, 450, 901 so that a deviation between the left eye and the right eye may be minimized, for example.

In operation 1140, the adjustment device 500 may calculate a number of PIMA lines displayed in each of the captured images, and a width of each of the PIMA lines, for example. The adjustment device 500 may calculate the deviation between the screen display portions 215a, 215b, 450, 901 based on a result of comparing the number and width of the PIMA lines to a threshold. The adjustment device 500 may determine whether to adjust the deviation between the screen display portions 215a, 215b, 450, 901, based on the result of the comparing. When a difference in a number and width of lines of the virtual image 610 between the captured images exceeds a predetermined threshold, the adjustment device 500 may determine to adjust the deviation between the left eye and the right eye. The adjustment device 500 may perform calibration on the screen display portions 215a, 215b, 450, 901 based on a determination as to whether to adjust the deviation.

In an embodiment, the adjustment device 500 may adjust the screen display portions 215a, 215b, 450, 901 based on the deviation, using the shaft 831 provided in each of a left temple and a right temple (e.g., the temple 737 of FIG. 7) or a rim (e.g., the rim 910 of FIGS. 9A and 9B) of the wearable electronic device 200, 300, 530, 630, 730, 800, 900, and using a driving device (e.g., the driving device 813 of FIGS. 8A and 8B, the driving devices 920 and 930 of FIGS. 9B and 9C, and the driving device 1010 of FIG. 10) installed on a stator (e.g., the stator 513 of FIG. 5, and the stator 713 of FIG. 7) of the case 510, 710, 810, as shown in FIG. 8A. In another embodiment, the adjustment device 500 may adjust the screen display portions 215a, 215b, 450, 901 in directions with 6DOF, based on the deviation, using the driving device 920, 930, 1010 included in each of the screen display portions 215a, 215b, 450, 901, as shown in FIGS. 9A to 10.

In an embodiment, the wearable electronic device 200, 300, 530, 630, 730, 800, 900 may further include the display 205, 210, 320, 410, 535, 735 that includes micro-reflection mirrors (e.g., micro-reflection mirrors 390) (e.g., micro electro mechanical system ("MEMS") mirrors) and projection lenses 325 and 415. Here, the adjustment device 500 may adjust at least one of an output direction and a view angle of light of the projection lenses 325 and 415 using the micro-reflection mirrors (e.g., micro-reflection mirrors 390) to adjust focal distances of the screen display portions 215a, 215b, 450, 901 in operation 1140.

In an alternative embodiment, the display 205, 210, 320, 410, 535, 735 of the wearable electronic device 200, 300, 530, 630, 730, 800, 900 may include a display (not shown) adjustable to a multifocal plane. Here, the display adjustable to the multifocal plane may be a phase-modulated micro display (not shown), for example, but is not necessarily limited thereto. In addition, in operation 1140, the adjustment device 500 may adjust the multifocal plane through phase modulation of the display 205, 210, 320, 410, 535, 735 to adjust the focal distances of the screen display portions 215a, 215b, 450, 901 based on the deviation. In an embodiment, the adjustment device 500 may adjust the multifocal plane to minimize the deviation between the screen display portions 215a, 215b, 450, 901 in the display 205, 210, 320, 410, 535, 735, for example.

Figure 12:
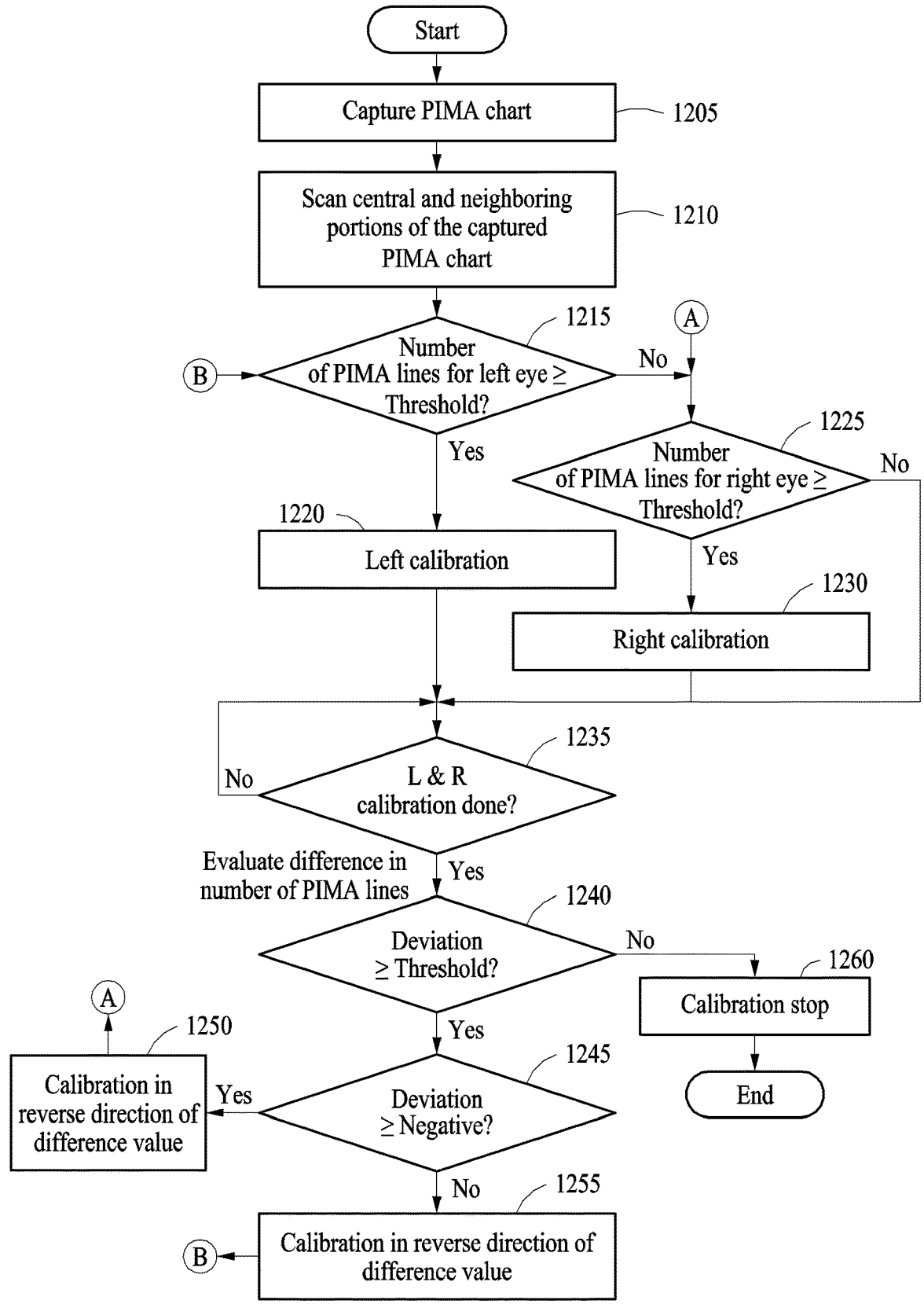
FIG. 12 is a flowchart illustrating another embodiment of a method of operating an adjustment device.

FIG. 12 is a flowchart illustrating another embodiment of a method of operating an adjustment device. In the following examples, operations may be performed sequentially, but not necessarily performed sequentially. In an embodiment, the order of the operations may be changed and at least two of the operations may be performed in parallel, for example.

FIG. 12 illustrates a process in which an adjustment device (e.g., the adjustment device 500 of FIG. 5) in an embodiment adjusts screen display portions (e.g., the screen display portions 215a and 215b of FIG. 2, the screen display portion 450 of FIG. 4, the screen display portions 901 of FIGS. 9A to 9C, and the screen display portions 1001 of FIG. 10) for a left eye and a right eye, through operations 1205 to 1270.

In operation 1205, the adjustment device 500 may capture virtual images 610 (e.g., PIMA charts) projected onto a portion (e.g., the portion 511 of FIG. 5, the portion 605 of FIG. 6A, and the portion 711 of FIG. 7) of a case (e.g., the case 510 of FIG. 5, the case 710 of FIG. 7, and the case 810 of FIG. 8A), in which a wearable electronic device (e.g., the wearable electronic device 200 of FIG. 2, the wearable electronic device 300 of FIG. 3, the wearable electronic device 530 of FIG. 5, the wearable electronic device 630 of FIG. 6A, the wearable electronic device 730 of FIG. 7, the wearable electronic device 800 of FIG. 8A, and the wearable electronic device 900 of FIG. 9A) is seated, by eye tracking cameras for the left eye and the right eye (e.g., the first eye tracking camera 270a and the second eye tracking camera 270b of FIG. 2) of the wearable electronic device 200, 300, 530, 630, 730, 800, 900.

In operation 1210, the adjustment device 500 may scan a central portion and a neighboring portion of the virtual images 610 captured in operation 1205 and may calculate (or obtain) a number of PIMA lines and a width of each of the PIMA lines in the central portion and neighboring portion of the virtual images 610, using an image processor (e.g., the processor 120 of FIG. 1) of the wearable electronic device 200, 300, 530, 630, 730, 800, 900.

In operation 1215, the adjustment device 500 may determine whether a number of PIMA lines corresponding to the left eye or a width of each of the PIMA lines is greater than or equal to a threshold, using the image processor 120 of the wearable electronic device 200, 300, 530, 630, 730, 800, 900. When it is determined in operation 1215 that the number of PIMA lines corresponding to the left eye is greater than or equal to the threshold, the adjustment device 500 may perform calibration on the screen display portions 215a, 215b, 450, 901 for the left eye, using the image processor 120 of the wearable electronic device 200, 300, 530, 630, 730, 800, 900 in operation 1220. Determining that the number of PIMA lines is greater than or equal to the threshold in operation 1215 may indicate that the screen display portions 215a, 215b, 450, 901 for the left eye are significantly misaligned, and accordingly the adjustment device 500 may adjust the screen display portions 215a, 215b, 450, 901 for the left eye to adjust a focus through calibration. In an embodiment, the adjustment device 500 may perform calibration based on the method of FIG. 8A, 9A, or 10, for example.

When it is determined in operation 1215 that the number of PIMA lines or the width of the PIMA lines is less than the threshold, the adjustment device 500 may determine whether a number of PIMA lines corresponding to the right eye or a width of each of the PIMA lines is greater than or equal to the threshold, using the image processor 120 of the wearable electronic device 200, 300, 530, 630, 730, 800, 900 in operation 1225. When it is determined in operation 1225 that the number of PIMA lines corresponding to the right eye is greater than or equal to the threshold, the adjustment device 500 may perform calibration on the screen display portions 215a, 215b, 450, 901 for the right eye, using the image processor 120 of the wearable electronic device 200, 300, 530, 630, 730, 800, 900 in operation 1230.

In operation 1235, the adjustment device 500 may determine whether the calibrations on the screen display portions 215a, 215b, 450, 901 for the left eye and the right eye are completed, using the image processor 120 of the wearable electronic device 200, 300, 530, 630, 730, 800, 900. When it is determined that the calibrations are not completed, the adjustment device 500 may allow the calibrations to be performed on the screen display portions 215a, 215b, 450, and 901 for the left eye and the right eye through operation 1215 or 1225. When it is determined in operation 1235 that the calibrations are completed, the adjustment device 500 may evaluate a difference in the number of PIMA lines of the screen display portions 215a, 215b, 450, 901 for the left eye and the right eye, that is, a deviation between the screen display portions 215a, 215b, 450, 901.

In operation 1240, the adjustment device 500 may determine whether the deviation between the screen display portions 215a, 215b, 450, 901 is greater than or equal to a threshold, using the image processor 120 of the wearable electronic device 200, 300, 530, 630, 730, 800, 900.

When it is determined in operation 1240 that the deviation is greater than or equal to the threshold, the adjustment device 500 may determine whether the deviation between the screen display portions 215a, 215b, 450, 901 is greater than or equal to a negative number, using the image processor 120 of the wearable electronic device 200, 300, 530, 630, 730, 800, 900 in operation 1245. When it is determined in operation 1245 that the deviation between the screen display portions 215a, 215b, 450, 901 is greater than or equal to the negative number, the adjustment device 500 may perform calibration in a reverse direction of a difference value corresponding to the deviation, using the image processor 120 of the wearable electronic device 200, 300, 530, 630, 730, 800, 900 in operation 1250. Here, the adjustment device 500 may perform calibration on the screen display portions 215a, 215b, 450, 901 for the right eye through operations 1225 and 1230.

When it is determined in operation 1245 that the deviation between the screen display portions 215a, 215b, 450, 901 is less than the negative number, the adjustment device 500 may perform calibration in a reverse direction of a difference value corresponding to the deviation, using the image processor 120 of the wearable electronic device 200, 300, 530, 630, 730, 800, 900 in operation 1255. Here, the adjustment device 500 may perform calibration on the screen display portions 215a, 215b, 450, 901 for the left eye through operations 1215 and 1220.

When it is determined in operation 1240 that the deviation is less than the threshold, the adjustment device 500 may finally terminate the calibration in operation 1260. In operation 1260, the adjustment device 500 may fix a screw of the stator 513, 713 of the case 510, 710, 810 or the screen display portions 215a, 215b, 450, 901 of the wearable electronic device 200, 300, 530, 630, 730, 800, 900 based on calibration of a current state, may perform bonding, and may terminate the calibration.

Figure 13:
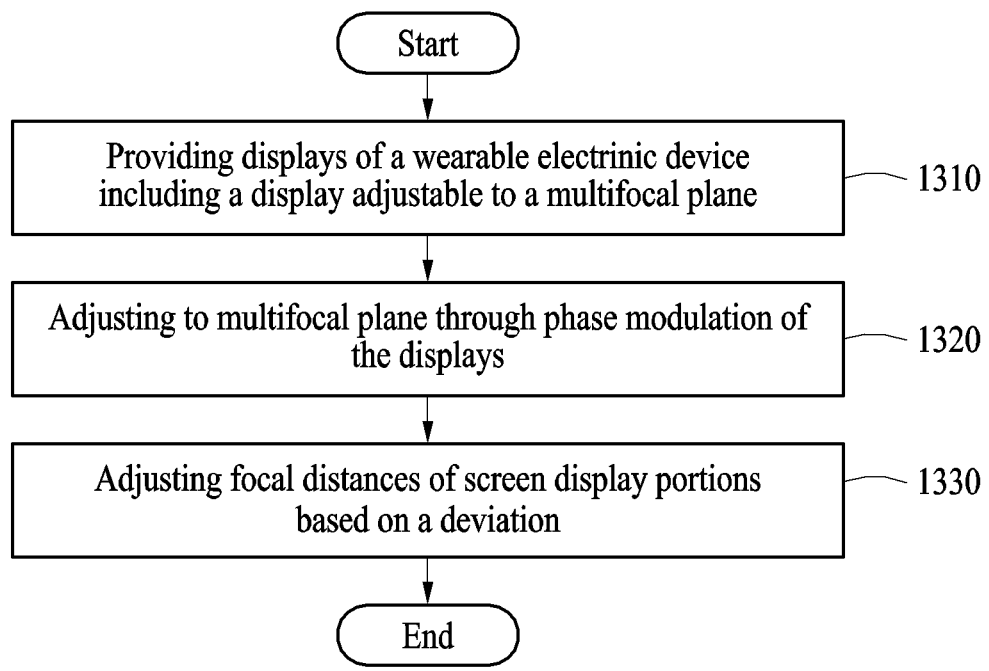
FIG. 13 is a flowchart illustrating an embodiment of a method of adjusting screen display portions using multifocal plane.

FIG. 13 is a flowchart illustrating another embodiment of a method of operating an adjustment device. In the following examples, operations may be performed sequentially, but not necessarily performed sequentially. In an embodiment, the order of the operations may be changed and at least two of the operations may be performed in parallel, for example.

FIG. 13 illustrates a process in which an adjustment device (e.g., the adjustment device 500 of FIG. 5) in an embodiment adjusts a multiple focal planes of the wearable electronic device, through operations 1310 to 1330.

In operation 1310, the adjustment device 500 may provide displays of a wearable electronic device including a display adjustable to a multifocal plane.

In operation 1320, the adjustment device 500 may adjust the multifocal plane through phase modulation of the displays provided in the operation 1310.

In operation 1330, the adjustment device 500 may adjust focal distances of the screen display portions based on a deviation adjusted through phase modulation in operation 1320. In an embodiment, an adjustment device 500 may include a wearable electronic device 200, 300, 530, 630, 730, 800, 900 and a case 510, 710, 810 in which the wearable electronic device 200, 300, 530, 630, 730, 800, 900 is seated. The wearable electronic device 200, 300, 530, 630, 730, 800, 900 may include displays 205, 210, 320, 410, 535, 735 which display virtual images 610 for a left eye and a right eye of a user, screen display portions 215a, 215b, 450, 901 which transmit light sources generated in the displays 205, 210, 320, 410, 535, 735 to the left eye and the right eye, and eye tracking cameras for the left eye and the right eye (e.g., the first eye tracking camera 270a and the second eye tracking camera 270b). The case 510, 710, 810 may include a stator 513, 713 which fixes the wearable electronic device 200, 300, 530, 630, 730, 800, 900, and a focal lens which is disposed within an eye relief of the fixed wearable electronic device 200, 300, 530, 630, 730, 800, 900 and allows images of the virtual images 610 output from the screen display portions 215a, 215b, 450, 901 of the wearable electronic device 200, 300, 530, 630, 730, 800, 900 to be formed on a portion 511, 605, 711 of an interior of the case 510, 710, 810.

In an embodiment, the portion 511, 605, 711 of the case 510, 710, 810 may include a flat surface without a curvature, and portions other than the portion 511, 605, 711 of the case 510, 710, 810 may be matt-coated or black-painted.

In an embodiment, the wearable electronic device 200, 300, 530, 630, 730, 800, 900 may capture images obtained by projecting the virtual images 610 for measuring a deviation between the screen display portions 215a, 215b, 450, 901 onto the portion 511, 605, 711 of the case 510, 710, 810, using the first eye tracking camera 270a and the second eye tracking camera 270b, and may adjust the screen display portions 215a, 215b, 450, 901 based on a comparison result of the captured images.

The wearable electronic device 200, 300, 530, 630, 730, 800, 900 may further include a processor 120 which performs image processing on the captured images and calculates the deviation between the screen display portions 215a, 215b, 450, 901, and a driving device 813, 920, 930, and 1010 which adjusts the screen display portions 215a, 215b, 450, 901 based on the deviation. The processor 120 may calculate a number of lines of a virtual image 610 for measuring a deviation and a width of each of the lines from each of the captured images, determine whether to adjust the deviation between the screen display portions 215a, 215b, 450, 901 based on a result of comparing the number and the width of the lines of the virtual image 610 to a predetermined threshold, and perform calibration on the left eye and the right eye of the screen display portions 215a, 215b, 450, 901 based on the determining.

In an embodiment, a shaft 831 may be provided in each of left and right outer rims 910, or each of left and right temples (e.g., the temples 737 of FIG. 7) of the wearable electronic device 200, 300, 530, 630, 730, 800, 900. The stator 513, 713 may further include a driving device 813, 920, 930, 1010 coupled to the shaft 831 to adjust the screen display portions 215a, 215b, 450, 901.

In an embodiment, the wearable electronic device 200, 300, 530, 630, 730, 800, 900 may further include a driving device 813, 920, 930, 1010 provided in each of the screen display portions 215a, 215b, 450, 901, and may adjust the screen display portions 215a, 215b, 450, 901 based on a deviation between the screen display portions 215a, 215b, 450, 901 using the driving device 813, 920, 930, 1010.

In an embodiment, the screen display portions 215a, 215b, 450, 901 may be fixed to a left rim and a right rim (e.g., rims 910) of the wearable electronic device 200, 300, 530, 630, 730, 800, 900, by at least one of a magnet 920, a coil 930, and a spring 940. Each of the screen display portions 215a, 215b, 450, 901 may be adjusted based on the deviation by at least one of the magnet 920, the coil 830, and the spring 940.

In an embodiment, driving devices 813, 920, 930, 1010 may be installed on a left rim and a right rim (e.g., rims 910) of the wearable electronic device 200, 300, 530, 630, 730, 800, 900, and the screen display portions 215a, 215b, 450, 901 may be adjusted by the driving device 813, 920, 930, 1010 based on the deviation.

In an embodiment, the displays 205, 210, 320, 410, 535, 735 may further include micro-reflection mirrors (e.g., micro-reflection mirrors 390) and projection lenses 325 and 415. The wearable electronic device 200, 300, 530, 630, 730, 800, 900 may adjust at least one of an output direction and a view angle of light of the projection lenses 325 and 415 using the micro-reflection mirrors (e.g., micro-reflection mirrors 390), and adjust focal distances of the screen display portions 215a, 215b, 450, 901 based on the deviation.

In an embodiment, the displays 205, 210, 320, 410, 535, 735 may include a display (not shown) adjustable to a multifocal plane. The wearable electronic device 200, 300, 530, 630, 730, 800, 900 may adjust the multifocal plane through phase modulation of the displays 205, 210, 320, 410, 535, 735, and adjust focal distances of the screen display portions 215a, 215b, 450, 901 based on the deviation between the screen display portions 215a, 215b, 450, 901.

In an embodiment, a method of operating an adjustment device 500 including a case 510, 710, 810 in which a wearable electronic device 200, 300, 530, 630, 730, 800, 900 including screen display portions 215a, 215b, 450, 901 for a left eye and a right eye of a user and eye tracking cameras for the left eye and the right eye (e.g., the first eye tracking camera 270a and the second eye tracking camera 270b) is seated may include transmitting a virtual image 610 for measuring a deviation between the screen display portions 215a, 215b, 450, 901 to the screen display portions 215a, 215b, 450, 901, projecting the virtual image 610 onto a portion 511, 605, 711 of the case 510, 710, 810 through a focal lens disposed in the case 510, 710, 810, capturing the projected virtual images 610 by the first eye tracking camera 270a and the second eye tracking camera 270b, and adjusting the screen display portions 215a, 215b, 450, 901 based on a comparison result of the captured images.

The adjusting of the screen display portions 215a, 215b, 450, 901 may include calculating the deviation between the screen display portions 215a, 215b, 450, 901 by performing image processing on the captured images, and adjusting the screen display portions 215a, 215b, 450, 901 based on the deviation.

The calculating of the deviation between the screen display portions 215a, 215b, 450, 901 may include calculating a number of PIMA lines displayed in each of the captured images and a width of each of the PIMA lines, and calculating the deviation between the screen display portions 215a, 215b, 450, 901 based on a result of comparing the number and width of the PIMA lines to a threshold.

In an embodiment, the method may further include determining whether to adjust the deviation between the screen display portions 215a, 215b, 450, 901 based on the result of the comparing, and performing calibration on the screen display portions 215a, 215b, 450, 901 based on the determining.

In an embodiment, the adjusting of the screen display portions 215a, 215b, 450, 901 may include at least one of adjusting the screen display portions 215a, 215b, 450, 901 based on the deviation using a shaft provided in a rim 910 or each of a left temple and a right temple of the wearable electronic device 200, 300, 530, 630, 730, 800, 900 and a driving device 813, 920, 930, 1010 installed in a stator 513, 713 of the case 510, 710, 810, and adjusting the screen display portions 215a, 215b, 450, 901 based on the deviation using a driving device 813, 920, 930, 1010 provided in each of the screen display portions 215a, 215b, 450, 901.

In an embodiment, each of the screen display portions 215a, 215b, 450, 901 may be fixed to the rim 910 of the wearable electronic device 200, 300, 530, 630, 730, 800, 900 by at least one of a magnet 920, a coil 930, and a spring 940. The adjusting of the screen display portions 215a, 215b, 450, 901 may include adjusting the screen display portions 215a, 215b, 450, 901 based on the deviation using at least one of the magnet 920, the coil 930, and the spring 940 that fix each of the screen display portions 215a, 215b, 450, 901.

In an embodiment, the adjusting of the screen display portions 215a, 215b, 450, 901 may include adjusting the screen display portions 215a, 215b, 450, 901 based on the deviation by driving devices 813, 920, 930, 1010 installed on a left rim and a right rim (e.g., rims 910) of the wearable electronic device 200, 300, 530, 630, 730, 800, 900.

In an embodiment, the wearable electronic device 200, 300, 530, 630, 730, 800, 900 may further include displays 205, 210, 320, 410, 535, 735 for the left eye and the right eye including micro-reflection mirrors and projection lenses 325 and 415. The adjusting of the screen display portions 215a, 215b, 450, 901 may include adjusting at least one of an output direction and a view angle of light of the projection lenses 325 and 415 using the micro-reflection mirrors and adjusting focal distances of the screen display portions 215a, 215b, 450, 901 based on the deviation.

In an embodiment, the displays 205, 210, 320, 410, 535, 735 of the wearable electronic device 200, 300, 530, 630, 730, 800, 900 may include a display adjustable to a multiple focal plane (refer to FIG. 13). The adjusting of the screen display portions 215a, 215b, 450, 901 may include adjusting the multifocal plane through phase modulation of the displays 205, 210, 320, 410, 535, 735 and adjusting focal distances of the screen display portions 215a, 215b, 450, 901 based on the deviation.

What is claimed is:

1. An adjustment device for virtual images corresponding to a left eye and a right eye of a user, the adjustment device comprising:
   a wearable electronic device which displays the virtual images, the wearable electronic device comprising:
      display apparatuses which correspond to the left eye and the right eye of the user and display the virtual images;
      screen display portions which correspond to the left eye and the right eye and transmit light sources generated by the display apparatuses to the left eye and the right eye;
      eye tracking cameras which correspond to the left eye and the right eye; and
      a processor which performs image processing on the captured images and calculates the deviation between the screen display portions; and
   a case in which the wearable electronic device is disposed, the case comprising:
      a stator which fixes the wearable electronic device; and
      a focal lens which is disposed within an eye relief of the fixed wearable electronic device and forms each of images of the virtual images output from the screen display portions of the wearable electronic device on a portion of the case,
   wherein the wearable electronic device captures images obtained by projecting the virtual images onto a portion of the case and measures a deviation between the screen display portions, and
   the processor calculates the deviation between the screen display portions by calculating a number of Photographic and Imaging Manufacturers Association ("PIMA") lines displayed in each of the captured images and a width of each of the PIMA lines from each of the captured images, calculates the deviation between the screen display portions based on a result of comparing the number and the width of the PIMA lines to a threshold, and adjusts the screen display portions based on the deviation, and.

2. The adjustment device of claim 1, wherein
a portion of an interior of the case comprises a flat surface without a curvature, and
portions other than the portion of the case are matt-coated or black-painted.

3. The adjustment device of claim 1, wherein the wearable electronic device measures the deviation between the screen display portions, using the eye tracking cameras.

4. The adjustment device of claim 3, wherein
the wearable electronic device further comprises:
   a driving device which adjusts the screen display portions based on the deviation, and
the processor determines whether to adjust the deviation between the screen display portions based on the result of comparing the number and the width of the PIMA lines to the predetermined threshold, and performs calibration on the left eye and the right eye of the screen display portions based on the determining.

5. The adjustment device of claim 1, wherein
a shaft is provided in each of left and right outer rims, or each of left and right temples of the wearable electronic device, and
the stator further comprises a driving device coupled to the shaft to adjust the screen display portions.

6. The adjustment device of claim 1, wherein
the wearable electronic device further comprises a driving device provided in each of the screen display portions, and
the wearable electronic device adjusts the screen display portions based on the deviation between the screen display portions, using the driving device.

7. The adjustment device of claim 6, wherein
the screen display portions are fixed to a left rim and a right rim of the wearable electronic device, respectively, by at least one of a magnet, a coil, and a spring, and
each of the screen display portions is adjusted based on the deviation by the at least one of the magnet, the coil, and the spring that fix each of the screen display portions.

8. The adjustment device of claim 6, wherein
driving devices are installed on a left rim and a right rim of the wearable electronic device, and
the screen display portions are adjusted by the driving devices based on the deviation.

9. The adjustment device of claim 1, wherein
the display apparatuses further comprise micro-reflection minors and projection lenses,
the wearable electronic device adjusts at least one of an output direction and a view angle of light of the projection lenses using the micro-reflection minors, and adjusts focal distances of the screen display portions based on the deviation between the screen display portions.

10. The adjustment device of claim 1, wherein the wearable electronic device further comprises:
a sensor which senses whether a shaft of the wearable electronic device is fastened to a hole of a driving device.

11. The adjustment device of claim 1, wherein a screen display portion of the screen display portions is adjustable by a first gear unit which is disposed on a side of a transparent member including the screen display portion and connectable with a second gear unit of a driving device of driving devices.

12. A method of operating an adjustment device comprising a case, in which a wearable electronic device comprising screen display portions corresponding to a left eye and a right eye of a user and eye tracking cameras corresponding to the left eye and the right eye are disposed, the method comprising:
transmitting virtual images;
measuring a deviation between the screen display portions to the screen display portions;
projecting the virtual images onto a portion of the case through focus lenses disposed in the case;
capturing the projected virtual images by the eye tracking cameras; and
adjusting the screen display portions based on a comparison result of the captured images,
wherein the adjusting the screen display portions comprises calculating the deviation between the screen display portions by performing image processing on the captured images and adjusting the screen display portions based on the deviation; and
wherein the calculating the deviation comprises:
calculating a number of Photographic and Imaging Manufacturers Association ("PIMA") lines displayed in each of the captured images and a width of each of the PIMA lines and adjusting the screen display portions based on the deviation, and
calculating the deviation between the screen display portions based on a result of comparing the number and the width of the PIMA lines to a threshold.

13. The method of claim 12, further comprising:
determining whether to adjust the deviation between the screen display portions based on the result of the comparing; and
performing calibration on the screen display portions based on the determining.

14. The method of claim 12, wherein the adjusting the screen display portions comprises at least one of:
adjusting the screen display portions based on the deviation using a shaft provided in a rim or each of a left temple and a right temple of the wearable electronic device and a driving device installed on a stator of the case; and
adjusting the screen display portions based on the deviation, using a driving device provided in each of the screen display portions.

15. The method of claim 14, wherein
each of the screen display portions is fixed to the rim of the wearable electronic device by at least one of a magnet, a coil, and a spring, and
the adjusting the screen display portions comprises adjusting the screen display portions based on the deviation using the at least one of the magnet, the coil, and the spring that fix each of the screen display portions.

16. The method of claim 14, wherein the adjusting the screen display portions comprises adjusting the screen display portions based on the deviation by driving devices installed on a left rim and a right rim of the wearable electronic device.

17. The method of claim 12, wherein
the wearable electronic device further comprises:
display apparatuses which correspond to the left eye and the right eye and comprise micro-reflection mirrors and projection lenses, and
the adjusting the screen display portions comprises:
adjusting at least one of an output direction and a view angle of light of the projection lenses using the micro-reflection mirrors and adjusting focal distances of the screen display portions based on the deviation.

18. A non-transitory computer-readable storage medium storing instructions that, when executed by a processor, cause the processor to perform the method of claim 12.

* * * * *